US 11,158,188 B2

(12) United States Patent
Ray et al.

(10) Patent No.: US 11,158,188 B2
(45) Date of Patent: Oct. 26, 2021

(54) AUTONOMOUS VEHICLE SAFETY SYSTEM

(71) Applicant: International Business Machines Corporation, Armonk, NY (US)

(72) Inventors: Shubhadip Ray, Secaucus, NJ (US); Sarbajit K. Rakshit, Kolkata (IN); Avik Sanyal, Kolkata (IN); John David Costantini, Jersey City, NJ (US)

(73) Assignee: International Business Machines Corporation, Armonk, NY (US)

( * ) Notice: Subject to any disclaimer, the term of this patent is extended or adjusted under 35 U.S.C. 154(b) by 195 days.

(21) Appl. No.: 16/412,478

(22) Filed: May 15, 2019

(65) Prior Publication Data
US 2020/0365014 A1      Nov. 19, 2020

(51) Int. Cl.
*G08G 1/01* (2006.01)
*G06K 9/00* (2006.01)

(52) U.S. Cl.
CPC ....... *G08G 1/0145* (2013.01); *G06K 9/00302* (2013.01); *G06K 9/00845* (2013.01); *G08G 1/0112* (2013.01)

(58) Field of Classification Search
CPC ...... G08G 1/0145; G08G 1/01; G08G 1/0112; G08G 1/00; G08G 1/096775; G08G 1/0967; G08G 1/087; G06K 9/00845; G06K 9/00; G06K 9/00302; G06K 9/00791; G08B 21/06; B60K 28/02; A61B 5/18; B60Q 9/005; B60Q 1/525; B60R 1/00; B60W 50/14; B62D 15/02; G05D 1/0246
USPC .......................................... 340/576; 701/117
See application file for complete search history.

(56) References Cited

U.S. PATENT DOCUMENTS

| | | |
|---|---|---|
| 6,198,996 B1 | 3/2001 | Berstis |
| 6,366,219 B1 | 4/2002 | Hoummady |
| 7,415,126 B2 | 8/2008 | Breed |
| 7,887,089 B2 | 2/2011 | Breed |
| 8,352,111 B2 | 1/2013 | Mudalige |
| 9,076,332 B2 | 7/2015 | Myr |

(Continued)

OTHER PUBLICATIONS

"Autonomous Intersection Management: Traffic Control for the Future", YouTube, Posted by csatc2002, published on Jun. 27, 2012, 9 pages, <https://www.youtube.com/watch?v=4pbAI40dK0A>.
"MIT researchers plan "death of the traffic light" with smart intersections", YouTube, posted by Dezeen, published on Mar. 21, 2016, 2 pages, <https://www.youtube.com/watch?v=kh7X-UKm9kw>.

(Continued)

*Primary Examiner* — Emily C Terrell
(74) *Attorney, Agent, or Firm* — William H. Hartwell; Isaac J. Gooshaw

(57) ABSTRACT

An autonomous computing system managed through an internet of things (IoT) protocol is provided. A computing device determines a clustering of autonomous vehicles based on expression sentiment data of each passenger of a respective autonomous vehicle. A computing device determines a node within an IoT network and monitors a plurality of autonomous vehicles traveling though the node. A computing device identifies a time frame in which each respective vehicle in the cluster is predicted to pass through an intersection. A computing device identifies a current traffic pattern of a vehicle that is external to the cluster of autonomous vehicles. The one or more processors adjust the traffic flow to allow the clustering of autonomous vehicles to pass through an intersection at a rate that maintains a threshold level of comfort for each passenger in the determined cluster of autonomous vehicles.

20 Claims, 10 Drawing Sheets

1000A $X(rider\ profile)$
$= \max [(\beta 1_{panic\ level} + \beta 2_{rider\ health} + \beta 3_{accident\ fear} + \beta 4_{thrill\ seeking})$
$- \beta 5_{hurry}(\beta 1_{panic\ level} + \beta 2_{rider\ health} + \beta 3_{accident\ fear} + \beta 4_{thrill\ seeking})$

1000B $Y(traffic\ conditions)$
$= \beta 1_{car\ speed} + \beta 2_{traffic\ density} + \beta 3_{cluster\ size} + \beta 4_{distance\ to\ intersection}$
$+ \beta 5_{weater} * (-\beta 6_{car\ type} - \beta 7_{tire\ health} + \beta 8_{|road\ angle|} + \beta 9_{road\ curve}$
$- \beta 10_{number\ of\ lanes})$

1000C $Z(cross\ traffic)$
$= \beta 1_{cross\ speed} + \beta 2_{cross\ density} + \beta 3_{cross\ cluster} + \beta 4_{cross\ distance} + \beta 5_{weather}$
$* (\beta 6_{|road\ angle|} + \beta 7_{road\ curve} + \beta 8_{number\ of\ lanes})$

(56) References Cited

U.S. PATENT DOCUMENTS

| | | | |
|---|---|---|---|
| 9,412,271 | B2 | 8/2016 | Sharma |
| 9,896,100 | B2* | 2/2018 | Gordon ................. B60W 30/16 |
| 2008/0167821 | A1 | 7/2008 | Breed |
| 2013/0018572 | A1 | 1/2013 | Jang |
| 2014/0218187 | A1* | 8/2014 | Chun ....................... A61B 5/18 |
| | | | 340/439 |
| 2017/0212511 | A1 | 7/2017 | Paiva Ferreira et al. |
| 2017/0370732 | A1* | 12/2017 | Bender .............. G01C 21/3492 |
| 2018/0162186 | A1 | 6/2018 | Anderson |
| 2018/0174457 | A1* | 6/2018 | Taylor ................ G06K 9/00302 |
| 2019/0073547 | A1* | 3/2019 | el Kaliouby ....... G06K 9/00302 |
| 2019/0187704 | A1* | 6/2019 | Gordon .............. G01C 21/3484 |

OTHER PUBLICATIONS

Jin et al.,"Platoon-based multi-agent intersection management for connected vehicle", 16th International IEEE Conference on Intelligent Transportation Systems (ITSC 2013), Oct. 6-9, 2013, pp. 1462-1467.

Matei, M., "Designed to Combat Car Sickness", Android Headlines, Nov. 21, 2017, 5:46am, 3 pages, <https://www.androidheadlines.com/2017/11/uber-patents-new-technology-designed-to-combat-car-sickness.html>.

Mell et al., "The NIST Definition of Cloud Computing", U.S. Department of Commerce, NIST Special Publication 800-145, Sep. 2011, 7 pages.

* cited by examiner $X(rider\ profile)$
$$= \max\left[\left(\beta 1_{panic\ level} + \beta 2_{rider\ health} + \beta 3_{accident\ fear} + \beta 4_{thrill\ seeking}\right)\right.$$
$$\left. - \beta 5 hurry\left(\beta 1_{panic\ level} + \beta 2_{rider\ health} + \beta 3_{accident\ fear} + \beta 4_{thrill\ seeking}\right)\right]$$

$Y(traffic\ conditions)$
$$= \beta 1_{car\ speed} + \beta 2_{traffic\ density} + \beta 3_{cluster\ size} + \beta 4_{distance\ to\ intersection}$$
$$+ \beta 5_{weater} * (-\beta 6_{car\ type} - \beta 7_{tire\ health} + \beta 8_{|road\ angle|} + \beta 9_{road\ curve}$$
$$- \beta 10_{number\ of\ lanes})$$

$Z(cross\ traffic)$
$$= \beta 1_{cross\ speed} + \beta 2_{cross\ density} + \beta 3_{cross\ cluster} + \beta 4_{cross\ distance} + \beta 5_{weather}$$
$$* (\beta 6_{|road\ angle|} + \beta 7_{road\ curve} + \beta 8_{number\ of\ lanes})$$

FIG. 10

AUTONOMOUS VEHICLE SAFETY SYSTEM

BACKGROUND OF THE INVENTION

The present invention relates generally to the field of automated driving systems, and more particularly to control methods.

Autonomous vehicles can reduce the duration of time waiting at traffic signals, and support communication channels between the computers of individual vehicles to create a traffic management system. With automated vehicles, safety is typically of utmost importance. Autonomous vehicles define levels of driving modes that vary from level 0 to level 5. Each respective level increases the level of automation from human interaction, ranging from automated issue warnings to a steering wheel being unnecessary for human use.

SUMMARY

Embodiments of the present invention provide a method, system, and program product of an IoT protocol to manage clustering of autonomous vehicles.

A first embodiment encompasses a method for managing an autonomous computing system through an internet of things (IoT) protocol. One or more processors monitor via a plurality of sensors within an IoT network, a computing device that identifies expression sentiment data. The one or more processors determine a clustering of autonomous vehicles based on expression sentiment data, of each passenger of a respective autonomous vehicle. The one or more processors monitor via a node within an IoT network, a plurality of autonomous vehicles traveling through the node. The one or more processors identify a time frame in which each respective vehicle in the cluster will take to pass through an intersection. The one or more processors identify current traffic patterns of one or more vehicles not in the cluster of autonomous vehicles. The one or more processors adjust traffic flow to allow the determined cluster of autonomous vehicles to pass through an intersection at a rate that maintains acceptable levels of comfort for each passenger in the determined cluster of autonomous vehicles.

A second embodiment encompasses a computer program product for managing an autonomous computing system through an internet of things (IoT) protocol. The computer program product includes one or more computer-readable storage media and program instructions stored on the one or more computer-readable storage media. The program instructions include program instructions to monitor via a plurality of sensors within an IoT network, a computing device that identifies expression sentiment data. The program instructions include program instructions to determine a clustering of autonomous vehicles based on expression sentiment data, of each passenger of a respective autonomous vehicle. The program instructions include program instructions to monitor via a node within an IoT network, a plurality of autonomous vehicles traveling through the node. The program instructions include program instructions to identify a time frame in which each respective vehicle in the cluster will take to pass through an intersection. The program instructions include program instructions to identify current traffic patterns of one or more vehicles not in the cluster of autonomous vehicles. The program instructions include program instructions to adjust traffic flow to allow the determined cluster of autonomous vehicles to pass through an intersection at a rate that maintains acceptable levels of comfort for each passenger in the determined cluster of autonomous vehicles.

A third embodiment encompasses a computer system for managing an autonomous computing system through an internet of things (IoT) protocol. The computer system includes one or more computer processors, one or more computer readable storage medium, and program instructions stored on the computer readable storage medium for execution by at least one of the one or more processors. The computer program product includes one or more computer-readable storage media and program instructions stored on the one or more computer-readable storage media. The program instructions include program instructions to monitor via a plurality of sensors within an IoT network, a computing device that identifies expression sentiment data. The program instructions include program instructions to determine a clustering of autonomous vehicles based on expression sentiment data, of each passenger of a respective autonomous vehicle. The program instructions include program instructions to monitor via a node within an IoT network, a plurality of autonomous vehicles traveling through the node. The program instructions include program instructions to identify a time frame in which each respective vehicle in the cluster will take to pass through an intersection. The program instructions include program instructions to identify current traffic patterns of one or more vehicles not in the cluster of autonomous vehicles. The program instructions include program instructions to adjust traffic flow to allow the determined cluster of autonomous vehicles to pass through an intersection at a rate that maintains acceptable levels of comfort for each passenger in the determined cluster of autonomous vehicles.

BRIEF DESCRIPTION OF THE SEVERAL VIEWS OF THE DRAWINGS

FIG. 10 depicts equations for determining certain variables leveraged by the autonomous computing system within the computing environment depicted in FIG. 1, in accordance with an exemplary embodiment of the present invention.

DETAILED DESCRIPTION

Figure 1:
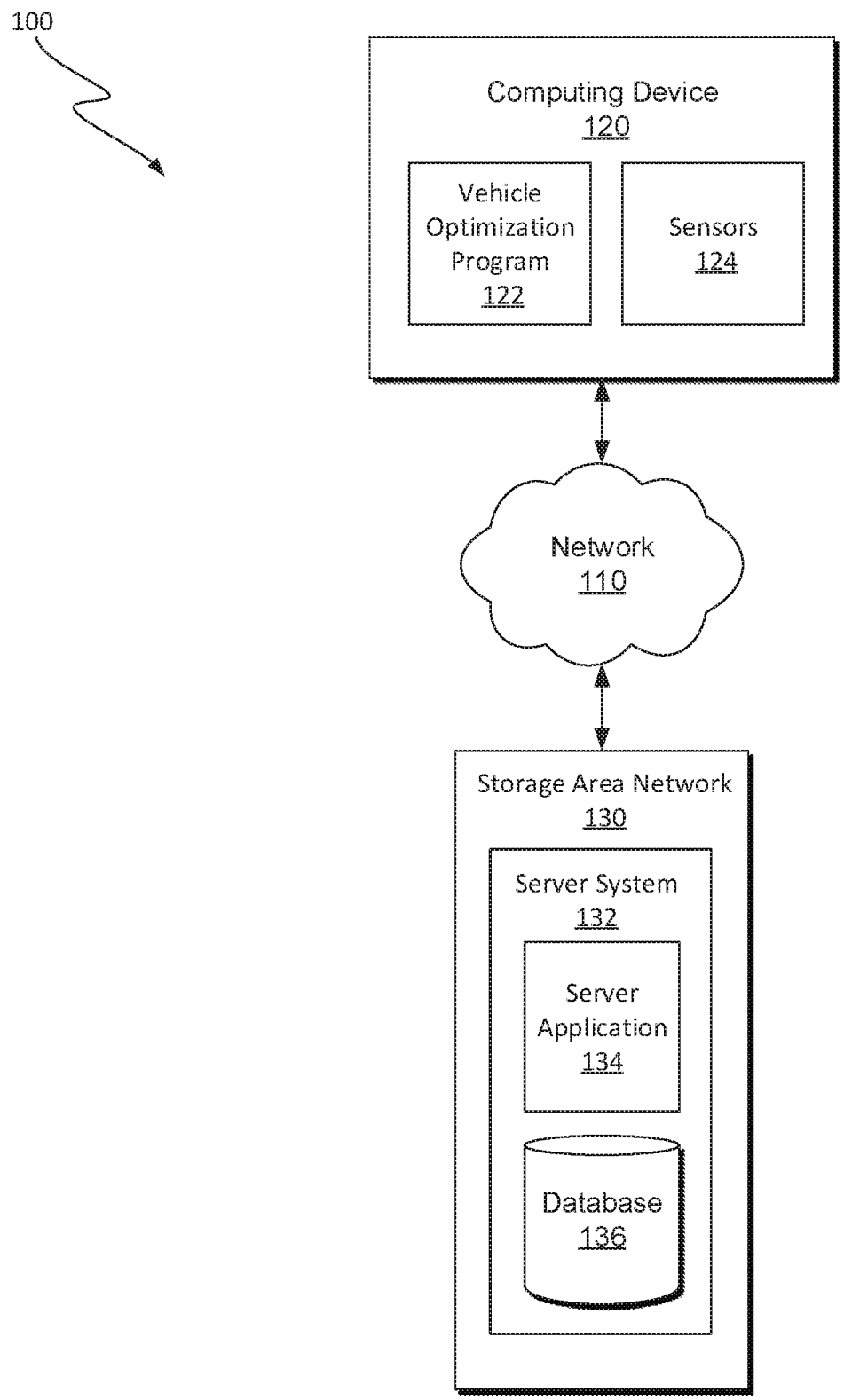
FIG. 1 is a functional block diagram illustrating a computing environment, in which an autonomous vehicle is managed through an internet of things (IoT) protocol, in accordance with an exemplary embodiment of the present invention.

Embodiments recognize that the driving operations of an autonomous vehicle are controlled, at least in part, by an autonomous driver that comprises a computing device and program instructions that are executed by that computing device. Embodiments recognize that the confidence level is ever increasing with most computer operated systems to ensure that a given autonomous vehicle is operating safely. Embodiments recognize that, in some scenarios, human interaction and judgment are still factors that can affect the safety of a given scenario. For example, a passenger overrides the commands of an autonomous vehicle such that a hazardous situation comes into existence. Embodiments provide a solution in which confidence of passengers is leveraged as a factor when determining a safety concern revolving around one or more automated vehicles. Embodiments provide and include an ability for a computer to recognize and improve the safety and performance of autonomous vehicles by leveraging (i) the passengers level of perceived safety along with (ii) application of controlling vehicle spacing and movement. Embodiments recognize that the actual safety of a passenger in a vehicle may not correspond to the level of safety that is perceived by the passenger. For example, a safe distance between two vehicles is determined to be fifteen feet and that distance corresponds to a required amount of space needed to stop a vehicle without causing an accident. However, a passenger, based on their personal perspective and thought processes, determines that the safe distance should be twenty-five feet. As such, the passenger's perceived level of safety differs from the actual level of safety based, at least in part, on the confidence the passenger has in the distance between the cars being sufficient to stop the vehicle without causing an accident.

Detailed embodiments of the present invention are disclosed herein with reference to the accompanying drawings. It is to be understood that the disclosed embodiments are merely illustrative of potential embodiments of the present invention and may take various forms. In addition, each of the examples given in connection with the various embodiments is intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While possible solutions to traffic management system of autonomous vehicles are known, these solutions may be inadequate to maintain the safety and the integrity of the vehicles on the roadways, because these solutions often focus on the vehicle's surroundings without understanding the perception and judgment that the passengers in the vehicle express. While it is important that an autonomous vehicle recognize and understand the vehicle's surroundings and determine whether the vehicle should brake because an object is in front of vehicle or whether the vehicle may change lanes on the roadway if the lane adjacent to the vehicle is open.

In general, autonomous vehicles operate using sensors to navigate the roadways and the immediate surroundings of the vehicles. The autonomous vehicles often determine the positions of other nearby vehicles or objects relative to the autonomous vehicle and further determine whether the autonomous vehicle should apply the brakes, accelerate, maintain the current speed, and/or change pathway, e.g., change lanes or roadways being taken. In general, autonomous vehicles recognize when objects or other vehicles are within the surroundings of the autonomous vehicle and the autonomous vehicle can properly navigate the roadways by changing lanes, negotiating turns, or other various driving maneuvers.

Embodiments recognize that certain autonomous vehicles may not provide an adequate perceived level of safety measures. Embodiments provide autonomous vehicle safety systems that increase safety by identifying and mitigating factors that can inhibit the ability of the autonomous vehicle to travel effectively and safely. Such factors include, but are not limited to, traffic density, cluster size, distance to intersection, weather, tire integrity, vehicle type, etc. In some embodiments, these factors are weighted and leveraged (i) into determination of a level of safety associated with autonomous vehicles, and (ii) to minimize potential negative interactions that may result from human perception and judgment. Embodiments recognize that a decrease or loss of confidence of a passenger in the ability of an autonomous driver of an autonomous vehicle to safely convey that passenger can lead to the passenger interfering with the control of the autonomous driver over the autonomous vehicle. In addition, it may be beneficial for passengers in the vehicles to maintain a level of confidence that the vehicle will drive appropriately and navigate the roadways in a safe manner. In general, the autonomous driver is a control system that is tasked with and controls movement of the autonomous vehicle when that vehicle is in an autonomous driving mode, i.e., when the passenger has turned driving control over to the automatic driving system of the autonomous vehicle.

The Internet of Things (IoT) is a type of emerging network infrastructure that benefits society. At a basic level, the IoT network integrates a distributed network of "things" into existing information technology infrastructure. In general, a "thing" in the IoT is an object embedded with sensors (i.e., an IoT sensory device) that generates data about an ambient environment so that the IoT sensory device can transmit that data to other nodes of an IoT network. Generally, IoT sensory devices are distributed throughout a residential, commercial, or industrial structure of monitor various environmental factors and/or activities within such structures. In many applications of IoT technology, the IoT sensory devices have minimal onboard processing power to reduce their respective costs, form factors, and power requirements. Depending on the placement, the redundancy, and the specific type(s) of sensors that are incorporated into an IoT sensory device, an IoT sensory device can obtain electrical power via onboard batteries and/or an electrical grid and can communicate data to other nodes in the IoT network via various wireless and/or wired protocols. In many applications of IoT technology, IoT sensory devices rely on more computationally powerful nodes in the IoT network to, among other things, analyze the data generated by the distributed and relatively simple IoT sensory devices and to present the data and any insights with respect to the data, to IoT portal users and/or computer systems.

Embodiments of the present invention also recognize that infringement of privacy can be a concern when raw data is propagated from IoT sensory devices to other nodes within an IoT network. If, for example, an IoT sensory device generates image(s) of a person, transmitting the image(s) to an IoT server for analysis may raise concerns with respect to the privacy of the imaged person and proper use of the image(s). Embodiments of present invention provide, as part of a "local" IoT environment, a gateway node that can ameliorate such concerns by aggregating and analyzing various kinds of raw sensory data and transmitting the result(s) of the analyses to higher level nodes instead of raw sensor data, the raw sensor data generally remaining within the local IoT environment (e.g., image data can remain on a gateway within the home of a monitored individual).

More specifically, embodiments of the present invention provide, as part of a local IoT environment (i.e., a local IoT network), a gateway that collects and stores unprocessed raw data received from IoT sensory devices generating data with respect to various conditions within a "monitored environment." The gateway processes the data received from the IoT sensory devices and stores the data, at least temporarily. The gateway aggregates and processes data from the IoT sensory devices in order to analyze conditions within the monitored environment for the occurrence of a "contract event." The contract event represents a request that an autonomous vehicle of an IoT application be sent notification(s) in response to either queries about the contract event and/or when the contract event occurs. As described subsequently in greater detail, an application server and/or IoT application describe the contract event, and various parameter related thereto, to the gateway as part of a communication between the primary autonomous vehicle, various autonomous vehicles, and the computer system. The usage-request includes, among other things, "detection conditions" for the contract event. More generally, the communications represent a negotiation to determine if the gateway and the local IoT environment can provide the requested service within the monitored environment. The gateway determines which sensory devices and/or combination of sensory devices to detect the contract event based, at least in part, on the pre-programmed templates and rules. Additionally, the gateway can advantageously and dynamically reconfigure, manage, and optimize sensory device configuration rules based on conditions in the monitored environment, the conditions of the IoT sensory devices within the local IoT environment, and identities of IoT sensory devices that connect to and disconnect from the gateway with the local IoT environment over a period of time. As described herein, the gateway can aggregate and analyze data from IoT sensory devices and can transmit information relating to the occurrence or nonoccurrence of a contract event to the application server, but the gateway does not necessarily transmit any raw data from IoT sensory devices to the application server.

In some embodiments, optimization for autonomous vehicles offers a new mechanism for safety measures by using internet of things (IoT) sensors and biometrics to analyze and determine improve the safety of autonomous vehicles. Instead of relying on autonomous vehicles to analyze their surroundings based purely on sensors that detect objects in the immediate surroundings of the autonomous vehicle, the use of IoT sensors and biometrics creates an improved safety feature for autonomous vehicle driving and navigation of roadways. When such an autonomous vehicle measures the passenger's emotions using biometrics and analyzes various vehicle and traffic data, such as: vehicle speed, traffic density, cluster size, distance to intersection, etc., then the autonomous vehicle can leverage this information to operate in a safer manner on the roadways. Such an approach often yields an increase in the level of safety in autonomous vehicles, since the passengers can maintain confidence that the autonomous vehicle will operate safely on roadways and reduce the possibility of a collision with other vehicles or objects.

Embodiments of the present invention provides: computing device comprises a plurality of sensors integrated within an IoT network that are capable of monitoring the environment and identify expression sentiment data. The present invention recognizes that by communicatively connecting various autonomous vehicles with a server-wide network, the autonomous vehicles are able to travel safely through intersections by monitoring and receiving expression sentiment data from the autonomous vehicle and various autonomous vehicles.

In one embodiment, a computing device comprises plurality of sensors within an IoT network that monitor and identify expression sentiment data. Vehicle optimization program 122 determines a clustering of autonomous vehicles based, at least in part, on the expression sentiment data of each passenger of a respective autonomous vehicle. Server application 134 monitors a plurality of autonomous vehicles through a node within an IoT network, wherein the node is communicatively connected within an IoT network. A time frame is identified by server application 134 in which each respective vehicle in the cluster is predicted to pass through an intersection node within an IoT network. Server application 134 identifies a current traffic pattern of a vehicle that is external to the cluster of autonomous vehicles on a roadway. Server application 134 adjusts traffic flow on a roadway to allow the clustering of autonomous vehicles to pass through an intersection at a rate that maintains a threshold level of comfort for each passenger in the cluster of autonomous vehicles.

In one embodiment, a plurality of sensors within an IoT network monitors passengers of an autonomous vehicle. Sensors 124 collect expression sentiment data of the passengers of an autonomous vehicle. Vehicle optimization program 124 analyzes the expression sentiment data. The plurality of sensors identifies a heightened passenger reaction based, at least in part, on the (i) trajectory and/or driving patterns of a primary autonomous vehicle and (ii) one or more autonomous vehicles surrounding a primary autonomous vehicle. Vehicle optimization program 122 determines the trajectory and driving patterns for an autonomous vehicle based, at least in part, on the expression sentiment data collected from the passengers of an autonomous vehicle.

In one embodiment, a plurality of sensors within an IoT network monitor an autonomous vehicle. Vehicle optimization program 122 identifies one or more user devices located within an autonomous vehicle. Vehicle optimization program 122 analyzes one or more user preferences located on the one or more user devices are analyzed. Vehicle optimization program stores the one or more user preferences on a database. Vehicle optimization program 122 determines the trajectory and driving patterns of an autonomous vehicle based, at least in part, on the user preferences. Responsive to determining the (i) trajectory and (ii) driving patterns of an autonomous vehicle based, at least in part, on the user preferences, server application 134 instructs a primary autonomous vehicle to travel on a roadway based, at least in part, on the (i) user preferences, (ii) trajectory and (iii) driving patterns.

In one embodiment, a plurality of sensors within an IoT network monitor one or more autonomous vehicles. Vehicle optimization program 122 receives data based, at least in part, on (i) expression sentiment data, (ii) proximity data, and (iii) the trajectory and driving patterns of one or more autonomous vehicles. Responsive to receiving data based, at least in part, on (i) expression sentiment data, (ii) proximity data, and (iii) the trajectory and driving patterns of one or more autonomous vehicles, analyzing the data received. Server application 134 determines the clustering of one or more autonomous vehicles based, at least in part, on (i) expression sentiment data, (ii) proximity data, and (iii) the trajectory and driving patterns of one or more autonomous vehicles.

In one embodiment, an intersection node within an IoT network is monitors a plurality of vehicles traveling through the intersection node. Server application 134 identifies (i) one or more autonomous vehicles, (ii) clusters of autonomous vehicles, and (iii) non-autonomous vehicles traveling through the intersection node. Server application 134 analyzes the trajectory and the driving patterns of the autonomous vehicles, clusters of autonomous vehicles, and non-autonomous vehicles traveling through the intersection node.

In one embodiment, the traffic patterns of vehicles traveling through the intersection nodes that are not a part of the clustering of autonomous vehicles are identified. Server application 134 determines a time frame in which each respective cluster of autonomous vehicles is predicted to pass through an intersection. Responsive to determining a time frame in which each respective cluster of autonomous vehicles will take to pass through an intersection, server application 134 generates a traffic control map.

In one embodiment, vehicle optimization program 122 receives a traffic control map. Vehicle optimization program 122 analyzes the traffic control map. Responsive to analyzing the traffic control map, a computing device is instructed to adjust (i) the trajectory, (ii) driving patterns, and (iii) traffic flow of one or more clusters of autonomous vehicles to travel through an intersection node.

The present invention will now be described in detail with reference to the Figures.

FIG. 1 is a functional block diagram illustrating a computing environment, generally designated 100, in accordance with one embodiment of the present invention. Computing environment 100 includes computing device 120 and storage area network (SAN) 130 connected over network 110. Computing device 120 includes vehicle optimization program 122 and sensors 124. SAN 130 includes server system 132 and database 134. Vehicle optimization program 122 include program instructions to perform the functions of the invention as described herein.

In various embodiments of the present invention, computing device 120 is a computing device that can be a standalone device, a server, a laptop computer, a tablet computer, a netbook computer, a personal computer (PC), a desktop computer, an autonomous vehicle, or any programmable electronic device capable of receiving, sending, and processing data. In general, computing device 120 represents any programmable electronic device or combination of programmable electronic devices capable of executing machine readable program instructions and communication with SAN 130, and other computing devices (not shown) within computing environment 100 via a network, such as network 110. In another embodiment, computing device 120 represents a computing system utilizing clustered computers and components to act as a single pool of seamless resources. In general, computing device 120 can be any computing device or a combination of devices with access to SAN 130 and network 110 and is capable of executing vehicle optimization program 122. Computing device 120 may include internal and external hardware components, as depicted and described in further detail with respect to FIG. 1. The present invention recognizes that FIG. 1 may include (not shown) any number of computing devices, servers, databases and/or storage devices, and the present invention is not limited to what is depicted in FIG. 1.

In this exemplary embodiment, vehicle optimization program 122 and sensors 124 are stored on computing device 120. However, in other embodiments, vehicle optimization program 122 and sensors 124 may be stored externally and accessed through a communication network, such as network 110. Network 110 can be, for example, a local area network (LAN), a wide area network (WAN) such as the Internet, or a combination of the two, and may include wired, wireless, fiber optic or any other connection known in the art. In general, network 110 can be any combination of connections and protocols that will support communications between computing device 120 and SAN 130, in accordance with a desired embodiment of the present invention.

Computing device 120 includes vehicle optimization program 122. Vehicle optimization program 122 provides an interface between computing device 120, SAN 130, and other various computing devices (not shown). In some embodiments, vehicle optimization program 122 can be a graphical user interface (GUI) or a web user interface (WUI) and can display text, documents, web browser, windows, user options, application interfaces, and instructions for operation, and includes the information (such as graphic, text, and sound) that a program presents to a user and the control sequences the user employs to control the program. In some embodiments, computing device 120 accesses data communicated from sensors 124 and/or SAN 130 via client-based application that runs on computing device 120. For example, computing device 120 includes mobile application software that provides an interface between computing device 120, SAN 130, and other various computing devices (not shown) that are connected via network 110.

Storage area network (SAN) 130 is a storage system that includes server system 132, server application 134, and database 136. SAN 130 may include one or more, but is not limited to, computing devices, servers, server-cluster, web servers, database and storage devices. SAN 130 operates to communicate with computing device 120 and other various computing devices over a network, such as network 110. For example, SAN 130 communicates with vehicle optimization program 122 to transfer data between, but is not limited to, database 134 and various other databases (not shown) that are connected to network 110. In general, SAN 130 can be any computing device or a combination of devices that are communicatively connected to a local IoT network, i.e., a network comprised of various computing devices including, but are not limited to computing device 120, to provide the functionality described herein. SAN 130 can include internal and external hardware components as described with respect to FIG. 4. The present invention recognizes that FIG. 1 may include any number of computing devices, servers, databases and/or storage devices, and the present invention is not limited to only what is depicted in FIG. 1. As such, in some embodiments, some or all of the features and functions of SAN 130 are included as part of computing device 120 and/or another computing device. Similarly, in some embodiments, some of the features and functions of computing device 120 are included as part of SAN 130 and/or another computing device.

Additionally, in some embodiments, SAN 130 represents a cloud computing platform. Cloud computing is a model or service delivery for enabling convenient, on demand network access to a shared pool of configurable computing resources (e.g., networks, network bandwidth, servers, processing, memory, storage, applications, virtual machines, and services) that can be rapidly provisioned and released with minimal management effort or interaction with a provider of a service. A cloud model may include characteristics such as on-demand self-service, broad network access, resource pooling, rapid elasticity, and measured service, can be represented by service models including a platform as a service (PaaS) model, an infrastructure as a service (IaaS) model, and a software as a service (SaaS) model; and can be implemented as various deployment models including as a private cloud, a community cloud, a public cloud, and a hybrid cloud.

In various embodiments, SAN 130 represents a local IoT network. In the embodiment depicted in FIG. 1, server system 132 and server application 134 are respectively stored on and executed by SAN 130. In other embodiments, application server 140 can store and/or execute a different count of applications without departing from the scope of the present invention. In general, server system 132 and server application 134 operate to transmit respective safety data to SAN 130, as described herein. Additionally, server system 132 and server application 134 operate to notify, via network 110, computing device 120 and various other computing devices (not shown) of conditions and/or respective contract events that may occur within SAN 130. In one example, server application 134 takes the form of a well-being monitoring application that utilizes elements of SAN 130 to monitor safety data transmitted from computing device 120 and various other computing devices (not shown) regarding the status of the autonomous vehicle's (e.g., computing device 120) trajectory (i.e., velocity, direction, etc.) and the surrounding driving patterns (i.e., negotiating lane changes, negotiating turns, tailgating, swerving, driving to close in proximity to surrounding vehicles, parking, etc.). This example will be referenced in various embodiments herein to illustrate various aspects of the present inventions, but the present inventions is not to be construed as being limited to such embodiments. In some embodiments, IoT applications executing on SAN 130 can also include analytics logic to analyze data from one or more gateways (e.g., gateway 221) to facilitate optimization of device configuration rules, template rules, and other logical operations utilized by the gateway(s), as described herein.

In various embodiments, server system 132 is depicted in FIG. 1 for illustrative simplicity. However, it is to be understood that, in various embodiments, server system 132 can include any number of databases that are managed in accordance with the functionality of server application 134. In general, database 136 represents data and server application 134 manages the ability to view the data. In other embodiments, server application 134 represents code that provides an ability to take specific action with respect to another physical or virtual resource and server application 134 manages the ability to use and modify the data. Vehicle optimization program 122 can also represent any combination of the aforementioned features, in which server application 134 has access to database 136. To illustrate various aspects of the present invention, examples of vehicle optimization program 122 are presented in which vehicle optimization program 122 represents one or more of, but is not limited to, a local IoT network and safety monitoring program.

In this exemplary embodiment, server application 134 and database 136 are stored on SAN 130. However, in other embodiments, server application 134 and database 136 may be stored externally and accessed through a communication network, such as network 110. Network 110 can be, for example, a local area network (LAN), a wide area network (WAN) such as the Internet, or a combination of the two, and may include wired, wireless, fiber optic or any other connection known in the art. In general, network 110 can be any combination of connections and protocols that will support communications between computing device 120, SAN 130, and various other computing devices (not shown) in accordance with a desired embodiment of the present invention.

In the embodiment depicted in FIG. 1, server application 134, at least in part, has access to vehicle optimization program 122 and can communicate safety data stored on SAN 130 to computing device 120. Alternatively, vehicle optimization program 122 has access to sever application 134 and can communicate safety data stored on computing device 120 and SAN 130. In some embodiments, computing device 120 and SAN 130 has access to various other computing devices (not shown) and can communicate data stored, respectively on computing device 120 and SAN 130 to the various other computing devices. For example, vehicle optimization program 122 defines an autonomous vehicle of computing device 120 that has access to safety data on database 136 and has access to safety data on other autonomous vehicles (e.g., various other computing devices).

In various embodiments depicted in FIG. 1 safety data is, at least in part, data obtained from sensors 124. Sensors 124 can include, but are not limited to, digital cameras, biometric devices, tachometers, speedometers, digital map, web mapping, tire-pressure gauge, laser distance meter. Sensors 124 operate to monitor and transmit data from various devices to vehicle optimization program 122. In some embodiments, sensors 124 operates to monitor and transmit data from various devices to server application 134.

In some embodiments depicted in FIG. 1, computing device 120 represents an autonomous vehicle, and includes, but is not limited to, vehicle optimization program 122 and sensors 124. Additionally, sensors 124 operate to collect the data from the various devices, as described above, and vehicle optimization program 122 operates to analyze the data obtained from sensors 124 and data obtained from SAN 130 to determine operating parameters to be utilized by the autonomous driver of the autonomous vehicle. In general, vehicle optimization program 122 operates to control the trajectory and driving patterns utilized by the autonomous vehicle. Additionally, vehicle optimization program 122 operates to analyze the data obtained from sensors 124 in conjunction with data obtained from SAN 130 (i.e., data communicated from various other computing devices) and operate the trajectory and driving patterns of the autonomous vehicle and/or operate the autonomous vehicle in connection with a cluster of autonomous vehicles (i.e., a cluster of various other computing devices).

In one embodiment, vehicle optimization program 122 receives data from sensors 124 to define how the autonomous vehicle operates by navigating the roadways. In some embodiments, vehicle optimization program 122 includes, communicates with, or is included as part of an autonomous driver program that controls, at least in part, the driving of one or more autonomous vehicles. Vehicle optimization program 122 analyzes the data obtained from sensors 124 and determines the trajectory and driving patterns associated with the autonomous vehicle (i.e., computing device 120). For example, vehicle optimization program 122 receives data from sensors 124 that the autonomous vehicle (i.e., computing device 120) is traveling to close in proximity to at least one other vehicle in front of the autonomous vehicle and begins to reduce the velocity of the autonomous vehicle by applying brakes to increase (i) the actual safety of the passengers, (ii) the perceived safety of the passengers as perceived by the passengers, and (iii) the integrity of the autonomous vehicle. Additionally, vehicle optimization program 122 receives data from sensors 124 and data from SAN 130 and determines that a cluster of autonomous vehicles are traveling in the same trajectory on a roadway. Vehicle optimization program 122 operates to communicate with the various other computing devices (i.e., cluster of autonomous vehicles) via the local IoT network (i.e., SAN 130) to travel at the same velocity and trajectory and maintain similar driving patterns to ensure the safety of all passengers and maintain the integrity of the vehicles.

In another example depicted in FIG. 1, a first cluster of autonomous vehicles are approaching an intersection at a similar trajectory. SAN 130 receives data that a second cluster of autonomous vehicles are approaching the intersection at a similar trajectory as the first cluster of autonomous vehicles, SAN 130 operates to communicate this data to the various computing devices (i.e., computing device 120) located on each autonomous vehicle, respectively. Vehicle optimization programs (i.e., vehicle optimization program 122) located on the individual autonomous vehicles (i.e., computing device 120), respectively, determine that the first cluster of autonomous vehicles should reduce the velocity of their trajectory to avoid a collision at the intersection with the second cluster of autonomous vehicles. Vehicle optimization programs located on the first cluster of autonomous vehicles reduce the velocity of the first cluster of autonomous vehicles and proceed through the intersection after the second cluster of autonomous vehicles proceed through the intersection, avoiding a collision of the two clusters of autonomous vehicles. In some scenarios and embodiment, vehicle optimization program 122 is located on a single computing device and communicates with multiple autonomous vehicles to control, at least in part, the trajectory and driving patterns of a group of autonomous vehicles.

In various embodiments, depicted in FIG. 1, vehicle optimization program 122 operates to negotiate computing device 120 (i.e., an autonomous vehicle) through various areas and/or along pathways. For example, along roadways and through roadway intersections, either individually, or as groups while avoiding collisions with various objects and other autonomous vehicles traveling through the same areas/intersections. In one example, vehicle optimization program 122 receives data from sensors 124 and SAN 130 that various other autonomous vehicles are traveling through the intersection from various directions (e.g., directions based on the cardinal directions North, South, East, West, etc.) and at various velocities. Vehicle optimization program 122 operates to communicate with the local IoT network node (i.e., the intersection) and communicate data to SAN 130 and analyze the best trajectory for computing device 120 to travel through the intersection (i.e., local IoT network node). Vehicle optimization program 122 determines that computing device 120 (i.e., autonomous vehicle) must reduce the velocity of the autonomous vehicle five mile per hour (mph) to avoid a collision with various other autonomous vehicles traveling through the intersection. Vehicle optimization program 122 increases the safety of the passengers, both perceived and actual, and maintains the integrity of the autonomous vehicle by operating to analyze and determine the best trajectory and driving patterns to travel through the intersection. In another example, vehicle optimization program 122 operates to analyze data received from sensors 124 that there is an object in close proximity of the autonomous vehicle (i.e., computing device 120) in the roadway. Vehicle optimization program 122 operates to avoid collision with the object by a variety of determinations (e.g., applying the brakes and coming to a stop, swerving around the object, changing lanes to avoid the object, etc.). In the present example, vehicle optimization program determines based, at least in part, on the safety data received from sensors 124 and data received from SAN 130 (i.e., safety data identifying the locations of other autonomous vehicles), that the autonomous vehicle (i.e., computing device 120) should change lanes to the left on the roadway to avoid a collision with the object. Vehicle optimization program 122 communicates this instruction to computing device 120 (i.e., autonomous vehicle) and computing device 120 operates to change lanes to the left and avoids the collision with the object and ensures the safety of the passengers and maintains the integrity of the vehicle.

In various embodiments, depicted in FIG. 1, sensors 124 represent biometric devices (i.e., camera, audio, motion analytics, etc.) to analyze the passengers' facial features, emotions, speech, etc. Further, sensors 124 operate to analyze the passengers' biometrics (i.e., facial and/or expression sentiment data) regarding and/or in response to the trajectory and driving patterns of the autonomous vehicle (i.e., computing device 120). Sensors 124 communicate the facial sentiment data to vehicle optimization program 122 identify the passengers' emotional status based, at least in part, on the data received from sensors 124 located within the autonomous vehicle (i.e., computing device 120). Additionally, vehicle optimization program 122 operates to determine if the autonomous vehicle should alter the trajectory and/or driving patterns based, at least in part, on facial and/or expression sentiment data of the passengers in the autonomous vehicle. For example, sensors 124 operate to analyze the biometrics of the passengers inside the autonomous vehicle (i.e., computing device 120) and extract facial and/or expression sentiment data. Sensors 124 communicates the facial and/or expression sentiment data to vehicle optimization program 122. Vehicle optimization program 122 operates to identify the passengers' emotions based, at least in part, on the facial and/or expression sentiment data. Vehicle optimization program 122 determines that passengers are expressing fear based, at least in part, on (i) the facial and/or expression sentiment data and (ii) the trajectory and driving patterns of the autonomous vehicle. Vehicle optimization program 122 operates to instruct the autonomous vehicle (i.e., computing device 120) to change the current driving pattern. For example, vehicle optimization program 122 operates to instruct the autonomous vehicle to reduce the velocity of the autonomous vehicle such that the distance between itself and a vehicle in front of it is increased from ten feet to twenty feet. In some embodiments, vehicle optimization program 122 predicts what type of change and how much of a change is required based on a prediction that such a change will reduce the concerns of the passengers such that the passengers are less likely to interfere with the driving operation of the vehicle. For example, vehicle optimization program 122 can change one or a combination of (i) distance between vehicles, change, (ii) rates of deceleration and/or acceleration, and/or (iii) the selected route of travel. One having ordinary skill in the art recognizes that there are multiple aspects that govern the driving operation of a vehicle and that various embodiments of vehicle optimization program 122 can operate to instruct the autonomous vehicle to change one or more of those aspects in accordance with a given scenario and/or embodiment.

In various embodiments, vehicle optimization program 122 notifies passengers (i.e., users of computing device 120) of an autonomous vehicle that computing device 120 collects data of the passenger. Additionally, vehicle optimization program 122 presents passengers with an opt-in/opt-out feature for passengers to authorize if they agree to their data being collected or not being collected. In some embodiments, vehicle optimization program 122 notifies passengers when the passengers' data is being collected. Vehicle optimization program 122 informs the passengers where the data has been sent.

In one embodiment of the present example, vehicle optimization program 122 instructs the autonomous vehicle (i.e., computing device 120) to change lanes more gradually and less erratically, at least from the perspective of the passengers, to ensure the safety of the passengers and the integrity of the vehicle. Additionally, in one embodiment of the present example, sensors 124 monitor the passengers' biometrics and extract the facial and/or expression sentiment data and communicate this data to vehicle optimization program 122. Moreover, vehicle optimization program 122 communicates with SAN 130 and receives data that the autonomous vehicle (i.e., computing device 120) is entering an intersection which is connected to a local IoT network. One having ordinary skill in the art will understand that the intersection is a node apart of a local IoT network infrastructure that communicates with a plurality of computing devices (i.e., autonomous vehicles) and intersection nodes. Vehicle optimization program 122 receives additional data from SAN 130 that various other autonomous vehicles are entering the intersection from various other directions in relation to the autonomous vehicle's trajectory. Further, vehicle optimization program 122 identifies that the passengers are nervous based, at least in part on (i) the facial and/or expression sentiment data and (ii) the autonomous vehicles trajectory and driving patterns. Vehicle optimization program 122 determines based, at least in part, on (i) the autonomous vehicle entering an intersection, (ii) the facial and/or expression sentiment data, and (iii) the autonomous vehicle's trajectory and driving patterns, that the autonomous vehicle should reduce the vehicles velocity in order to increase the distance between the autonomous vehicle and the surrounding vehicle to increase the safety of the passengers, maintain the integrity of the vehicle, and maintain passenger confidence that a collision is not imminent. As such, vehicle optimization program 122 operates to (i) determine an emotional state of the passengers, (ii) make predictions regarding possible behavior of those passengers, and then (iii) modify the driving pattern of the autonomous vehicle by adjusting one or more aspects that govern the driving of the autonomous vehicle such that there is a reduced probability that a given passenger will interfere with the automatic drivers control over the autonomous vehicle while maintaining at least a minimum level of actual safety that is determined based on, but is not limited to, the current movement of the vehicle and the environment surrounding the vehicle. For example, based on the current movement of the vehicle, the environment surrounding the vehicle, along with a selected route of travel, vehicle optimization program 122 determines a minimum safe distance between vehicles and uses that distance as a baseline, i.e., an acceptable amount of distance between vehicles can be equal to or greater than that minimum distance.

In various embodiments depicted in FIG. 1, SAN 130 represents a local IoT network. Further, intersections, interchanges and the like on roadways represent nodes within the local IoT network. One having ordinary skill in the art would recognize that these nodes (i.e., intersections, interchanges and the like) operate to communicate data between other nodes and various other computing devices (i.e., computing device 120). Further, one having ordinary skill in the art would understand that the local IoT network operates to create a seamless transition of traffic on the roadways, by communicating data between the nodes and computing devices.

Figure 2:
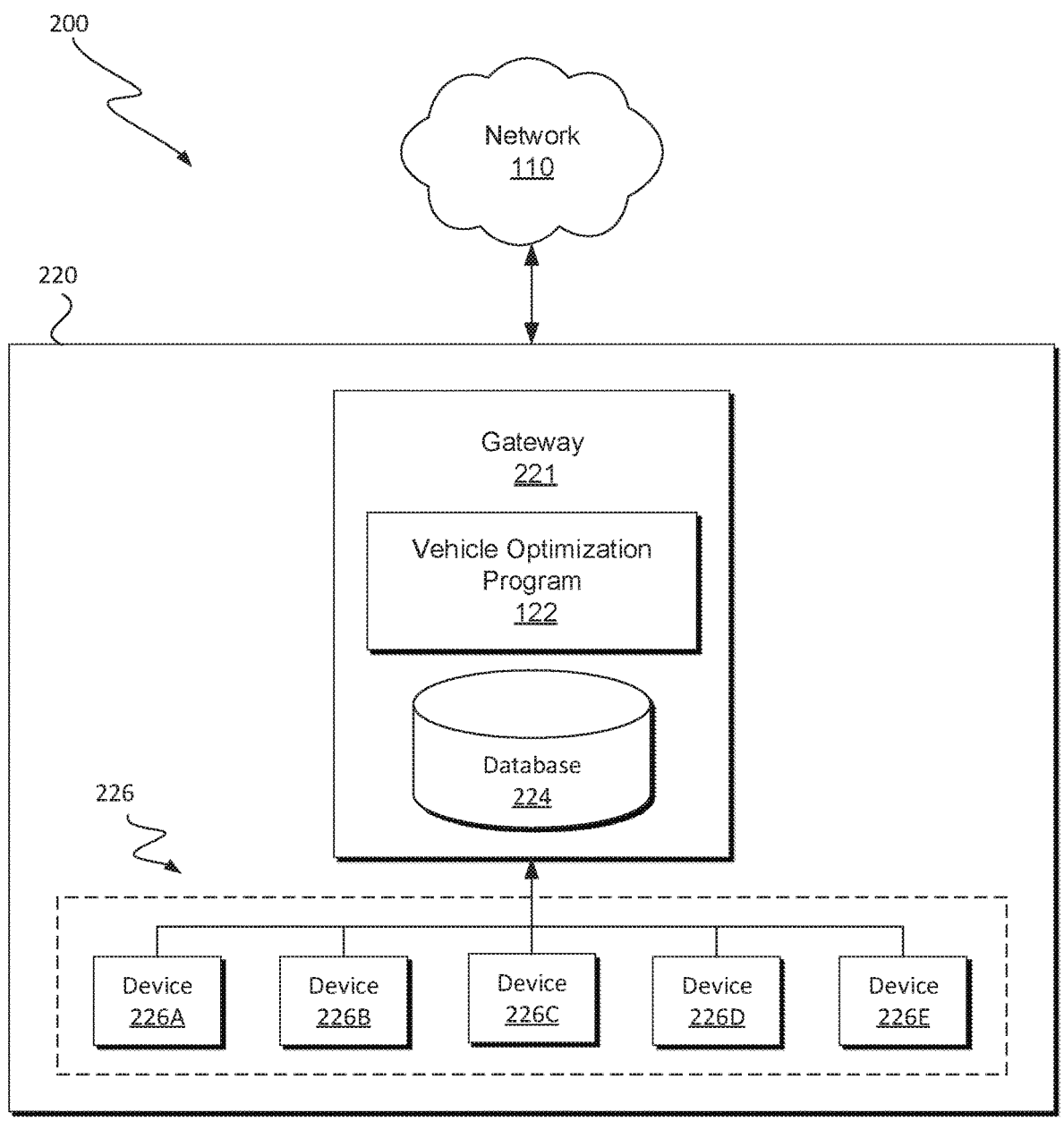
FIG. 2 is a functional block diagram illustrating an alternative embodiment of the computing environment depicted in FIG. 1 in greater detail, in accordance with an exemplary embodiment of the present invention.

FIG. 2 is a functional block diagram illustrating a computing device, generally designated 200, in accordance with one embodiment of the present invention. Computing device 200 includes gateway 221, gateway logic 222, database 224 and devices 226.

In various embodiments of the present invention, computing device 200 is a computing device that can be a standalone device, a server, a laptop computer, a tablet computer, a netbook computer, a personal computer (PC), a desktop computer, an autonomous vehicle, or any programmable electronic device capable of receiving, sending, and processing data. In general, computing device 220 represents any programmable electronic device or combination of programmable electronic devices capable of executing machine readable program instructions and communications with a server (i.e., SAN 130), and other computing devices (not shown) within computing environment 100 via a network, such as network 110. In another embodiment, computing device 220 represents a computing system utilizing clustered computers and components to act as a single pool of seamless resources. In general, computing device 220 can be any computing device or a combination of devices with access to SAN 130 and network 110 and is capable of executing vehicle optimization program 122. Computing device 220 may include internal and external hardware components, as depicted and described in further detail with respect to FIG. 2. The present invention recognizes that FIG. 2 may include (not shown) any number of computing devices, servers, databases and/or storage devices, and the present invention is not limited to what is depicted in FIG. 2.

In the embodiment depicted in FIG. 2, computing device 220 represents a local IoT network and includes gateway 221, which communicatively connected to SAN 130 and/or various other computing devices via network 110, and devices 226. Gateway 221 includes vehicle optimization program 122 and database 224, which are described in greater detail with respect to at least FIG. 2. In various embodiments, gateway 221 represents a computing device that can be a standalone device, a server, a laptop computer, a tablet computer, a netbook computer, a personal computer (PC), a desktop computer, or any programmable electronic device capable of receiving, sending, and processing data or any combination or number thereof. In some embodiments, for example, gateway 221 is analogous to a router that is provisioned with sufficient processing power, memory, and persistent storage (e.g., network-attached-storage (NAS) drives) to provide the functionality attributed to gateway 221 herein. In some embodiments, it is advantageous to provision gateway 221 with a user interface to facilitate initial configuration and updating of hardware and/or software of gateway 221. The user interface can be provided via a virtual interface (e.g., a graphical user interface accessed via a network communication and another computing device) and/or an interface that is presented via one or more displays and manipulated via one or more user-input devices that are physically connected to, or integrated with, gateway 221. Gateway 221 can include internal and external hardware components as described with respect to FIG. 2.

In this exemplary embodiment, gateway 221, vehicle optimization program 122 and database 226 are stored on computing device 220. Devices 226 comprise device 226A, device 226B, device 226C, device 226D, device 226E, but are not limited thereto without departing from the scope of the present invention. Devices 226 represents one or more user devices (i.e., mobile devices, cellphones, tablets, smartwatches, etc.) and are comprised of user preferences within the local physical environment (i.e., within a respective portion of the local IoT network, designated as computing device 220) and communicate with gateway 221 via a wired and/or wireless connection and an IoT protocol. In some embodiments, one or more devices 226 represents an IoT node within the IoT network. Further, devices 226 comprise a user interface that can be utilized to set a predetermined set of user preferences. One having ordinary skill in the art will understand that a user device (e.g., a smartphone) is a programmable computing device that includes a user interface and can establish a set of user preferences. In one example, devices 226 represents a smartphone owned by a user, wherein the user smartphone has a predefined set of user preferences that identifies how the autonomous vehicle should travel, including the maximum speed of their vehicle and the distance to be maintained between vehicles. The user smartphone contains user preferences that identify that the autonomous vehicle should maintain a further distance between other vehicles and that lane changes and the like should be more gradual and less erratic than the default preferences. The user smartphone (i.e., devices 226) communicates these user preferences to vehicle optimization program 122. As described above in FIG. 1, vehicle optimization program 122 operates to identify the user preferences received from devices 226 and analyzes the user preferences. Vehicle optimization program 122 determines that the user smartphone (i.e., passenger) requires the autonomous vehicle (i.e., computing device 220) to travel in a safer manner than proscribed by the default preferences. Further, vehicle optimization program 122 instructs the autonomous vehicle to maintain a further distance from various other vehicles on the roadways and instructs the autonomous vehicle to make more gradual lane changes and the like than the default preferences. Vehicle optimization program 122 further operates to communicate this data (i.e., user preferences) to another local IoT network (i.e., SAN 130), as described in FIG. 1. SAN 130 receives this data and communicates this data throughout the various nodes in the local IoT network and various other computing devices (i.e., autonomous vehicles), to maintain the safety on the roadways by communicating data that the autonomous vehicle will provide a greater distance between vehicles and will make more gradual lane changes and the like than the default preferences.

Database 224 is a data repository that may be written to and read by vehicle optimization program 122 as described herein. In general, database 224 represents one or more volatile and/or non-volatile computer memories that vehicle optimization program 122 can read from and write to. In some embodiments, one or more memories represented by database 224 are physically integrated into the structure of gateway 221. In other embodiments, one or more memories represented by database 224 are physically remote from gateway 221 and vehicle operation program 122 accesses the remote memories via a network such as network 110 or a separate network. For example, in one embodiment network-attached storage device(s) are included on a local network within computing environment 100 and comprise a portion of local IoT 150 of an autonomous vehicle. In yet another embodiment, database 224 represents a combination of memories that are physically integrated with gateway 221 and memories that are physically remote from gateway 221. In the embodiment depicted FIG. 2, database 224 stores data and user preferences received from device 226A, 226B, 226C, 226D, and 226E. The various logical units of gateway 221 represented in FIG. 2 read from and write to database 224 as described herein. In some embodiments, database 224 is written to and read by programs and entities outside of local network within computing environment 100 in order to populate the repository with data. In some embodiments, for example, server application 134 or entities not depicted in computing environment 100 can rep-populate database 224 with data and user preferences.

In various embodiments depicted in FIG. 2, devices 226 can read and/or write to database 224 and communicates with entities located within local network within computing environment 100. Vehicle optimization program 122 operates to communicate the data devices 226 read and/or write to database 224 with entities outside of the local IoT network (i.e., computing device 220) via network 110. Further, devices 226 operate to read and/or write the predefined user preferences to database 224. Database 224 stores these user preferences for use, at least, during a second travel. In various embodiments, a user of devices 226 can update their user preferences, as such, devices 226 read and/or write the updated user preferences to database 224 and store the data therein.

Figure 3:
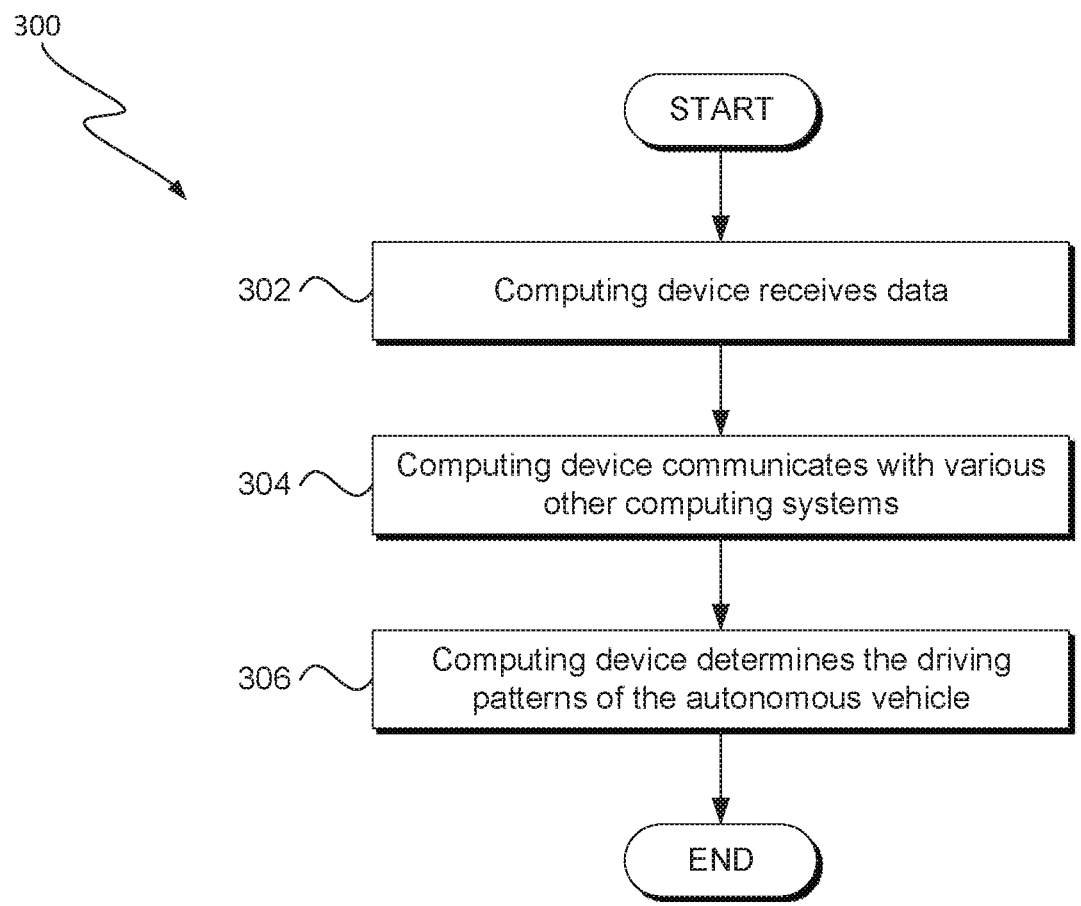
FIG. 3 illustrates operational processes of an IoT protocol executing operations to manage clustering of autonomous vehicles, on a computing device within the environment of FIG. 1, in accordance with an exemplary embodiment of the present invention.

FIG. 3 depicts a flowchart depicting operations for an IoT protocol managing clustering of autonomous vehicles for computing environment 100, in accordance with an illustrative embodiment of the present invention. More specifically, FIG. 3, depicts combined overall operations, 300, of vehicle optimization program 122 (stored on computing device 220). In some embodiments, operations 300 represents logical operations of vehicle optimization program 122, wherein sensors 124 represents interactions between logical units executing on computing device 120. Further, operations 300 can include a portion or all of combined overall operations of 200. It should be appreciated that FIG. 3 provides an illustration of one implementation and does not imply any limitations with regard to the environments in which different embodiments may be implemented. Many modifications to the depicted environment may be made. In one embodiment of flowchart 300, the series of operations can be performed in any order. In another embodiment, the series of operations, of flowchart 300, can be performed simultaneously. Additionally, the series of operations, in flowchart 300, can be terminated at any operation. In addition to the features previously mentioned, any operations, of flowchart 300, can be resumed at any time.

In operation 302, vehicle optimization program 122 of computing device 120 utilizes sensors 124 to gather data regarding the passengers occupying the primary autonomous vehicle (i.e., computing device 120), data regarding the primary autonomous vehicle's surroundings, as well as data regarding the trajectories of the surrounding autonomous vehicles and autonomous vehicles approaching an IoT node (i.e., intersection). As recognized above, vehicle optimization program 122 receives this data from sensors 124, and vehicle optimization program 122 communicates with server system 132 to send and/or receive data regarding various autonomous vehicles. In various embodiments, computing device 120 receives expression sentiment data from each passenger occupying the primary autonomous vehicle. Vehicle optimization program 122 operates to analyze the expression sentiment data based, at least in part, on the trajectory and driving patterns of the (i) the primary autonomous vehicle and (ii) the cluster of autonomous vehicles. In some embodiments, vehicle optimization program 122 operates to communicate with SAN 130 and various other autonomous vehicles (not shown) via network 110 to create a cluster of autonomous vehicles to travel in a defined trajectory and travel under defined driving patterns. Further, vehicle optimization program 122 generates a cluster of autonomous vehicles based on the expression sentiment data of each passenger in the respective autonomous vehicle. In one example, vehicle optimization program 122 identifies that passengers in a first autonomous vehicle are panicked by the autonomous vehicles trajectory and driving patterns and/or the trajectory and driving patterns of the surrounding autonomous vehicles based, at least in part, on the expression sentiment data obtained by sensors 124. Vehicle optimization program 122 communicates with SAN 130 to identify a first cluster of autonomous vehicles that are traveling at a slower trajectory and exhibit a pattern of more gradual driving patterns. Vehicle optimization program 122 determines that the first autonomous vehicle will join the first cluster of autonomous vehicles. Further, a second autonomous vehicle (i.e., computing device 120) receives expression sentiment data from each passenger occupying the, at least, second autonomous vehicle, as recognized above. The second autonomous vehicle identifies that the passengers occupying the second autonomous vehicle are "in a rush" and require the, at least, second autonomous vehicle to reach the passengers' destination in a quicker time frame. The second autonomous vehicle operates to accelerate and increase the trajectory of the autonomous vehicle. Further, the second autonomous vehicle operates to communicate with SAN 130 and various other autonomous vehicles to identify a cluster of autonomous vehicles that are traveling in a cluster at an increased rate of acceleration. Dependent upon whether the second autonomous vehicle locates, at least, a second cluster of autonomous vehicles that are traveling at a similar trajectory, the second autonomous vehicle will join the second cluster of autonomous vehicles. However, if the second autonomous vehicle is unable to locate a cluster of autonomous vehicles traveling at a similar trajectory, the second autonomous vehicle will continue to travel individually, until another autonomous vehicle joins the second autonomous vehicle and/or the second autonomous vehicle locates a second cluster of autonomous vehicles.

In operation 304, responsive to determining the clustering of autonomous vehicles, computing device 120, SAN 130 and various other computing devices (not shown), communicate between one another to identify a time frame in which each respective clustering of autonomous vehicles and/or individual autonomous vehicles to proceed through a roadway intersection (i.e., IoT node). Vehicle optimization program 122 operates to communicate with the IoT node (i.e., intersection) and SAN 130 to identify how many vehicles are traveling through the intersection at what time and what trajectory. Further, vehicle optimization program 122 determines based, at least in part, on the trajectory and time of the various other autonomous vehicles, when the first cluster of autonomous vehicles should pass through the intersection to avoid collisions with various other clusters of autonomous vehicles traveling through the intersection. Further, vehicle optimization program 122 operates to communicate data received by sensors 124 to SAN 130, an IoT node, and/or various other computing devices (not shown in FIG. 1). In some embodiments, vehicle optimization program 122 operates to receive data from SAN 130, an IoT node, and/or various other computing devices.

In operation 306, vehicle optimization program 122 operates to determine the trajectory and/or driving patterns of the primary autonomous vehicle (i.e., computing device 120) based, at least in part, on (i) the data received from sensors 124 and (ii) the data received from SAN 130, an IoT node, and various other computing devices (not shown in FIG. 1). In various embodiments, vehicle optimization program 122 operates to adjust the trajectory and/or driving patterns of the primary autonomous vehicle based, at least, on the data received from sensors 124. Further, vehicle optimization program 122 analyzes the data to identify the type of expression sentiment data received. For example, vehicle optimization program 122 identifies that the passengers occupying the primary autonomous vehicle are scared. Vehicle optimization program 122 operates to determine that the passengers are scared based, at least in part, on the trajectory and/or driving patterns of the primary autonomous vehicle. Further, vehicle optimization program 122 operates to reduce the velocity of the primary autonomous vehicle to maintain confidence in the passengers that the primary autonomous vehicle will not be involved in a collision with another vehicle and/or object.

Figure 4:
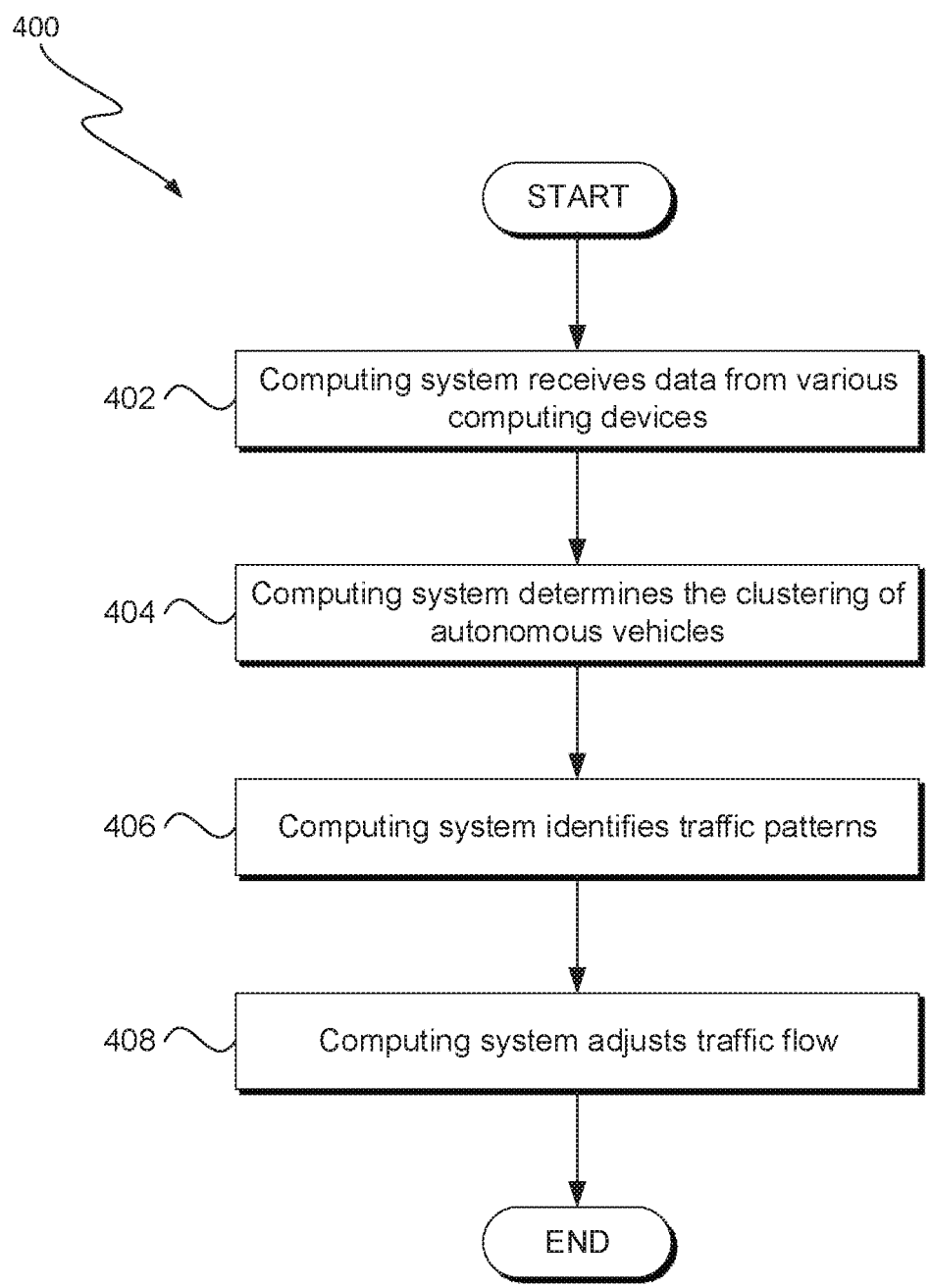
FIG. 4 illustrates operational processes of an IoT protocol executing operations to manage clustering of autonomous vehicles, on a computing device within the environment of FIG. 1, in accordance with an exemplary embodiment of the present invention.

FIG. 4 is a flowchart depicting operations for an IoT protocol managing clustering of autonomous vehicles for computing environment 100, in accordance with an illustrative embodiment of the present invention. More specifically, FIG. 4, depicts combined overall operations 400, server application 134. In some embodiments, operations 400 represents logical operations of server application 134, wherein server application 134 represents interactions between logical computing devices communicating with SAN 130 and various other computing devices through network 110. It should be appreciated that FIG. 4 provides an illustration of one implementation and does not imply any limitations with regard to the environments in which different embodiments may be implemented. Many modifications to the depicted environment may be made. In one embodiment, the series of operations, in flowchart 400, can be terminated at any operation. In additions to the features previously mentioned, any operations of flowchart 400, can be resumed at any time.

In operation 402, server application of SAN 130 communicates with computing device 120 and a plurality of various computing devices. In an alternative embodiment, SAN 130 communicates with computing device 120 and a plurality of various computing devices. SAN 130 utilizes server application 134 to identify and analyze the data received from computing device 120 and the plurality of computing devices. Server application 134 operates to analyze the data received from computing device 120 and the plurality of computing devices. Server application 134 stores the data on database 136. In operation 402, vehicle optimization program 122 and server application 134 operate to calculate variables, but are not limited to X, Y, and Z. Wherein, the X variables represent, but are not limited to, the passenger profile, the Y variables represent, but are not limited to, the traffic conditions, and the Z variables represent, but are not limited to, cross traffic traveling through the intersection. X, Y, and Z are plotted in a plurality of dimensions, wherein K represents the clustering method used to group autonomous vehicles into separate classifications. The variables X, Y, and Z are calculated in accordance with FIG. 10.

In operation 404, server application 134 operates to determine the appropriate cluster of autonomous vehicles based, at least in part, on the data received from computing device 120 and the plurality of computing devices. In an alternative embodiment, SAN 130 operates to determine the appropriate cluster of autonomous vehicles based, at least in part, on the data received from computing device 120 and the plurality of computing devices. In various embodiments, server application 134 determines that a first set of autonomous vehicles are grouped together into a cluster (i.e., cluster 1) based, at least in part, on the data received from the autonomous vehicles. For example, server application 134 identifies that the passengers of autonomous vehicles contained in cluster 1 express fear of driving based, at least in part, on the expression sentiment data received by server application 134. Further, server application 134 instructs cluster 1 to drive at a reduced velocity. In another example, server application 134 identifies that passengers in, at least, a second group of autonomous vehicles (i.e., cluster 2) express a desire to reach their destination at an accelerated rate based at least in part on the expression sentiment data received by server application 134. Server application 134 operates to instruct cluster 2 to drive at an accelerated rate. In operation 404, vehicle optimization program 122 operates to calculate the clustering of autonomous vehicles in real time as data is communicated between computing device 120 (i.e., primary autonomous vehicle), SAN 130 and various other computing devices (i.e., various other autonomous vehicles). Additionally, server application 134 operates to analyze the data received from computing device 120 and various other computing devices (not shown) as the autonomous vehicles approach the intersection. Server application 134 operates to cluster similarly situated vehicles and passengers into clusters to accommodate the (i) user preferences and (ii) trajectory and driving patterns of the autonomous vehicles. Server application 134 communicates to the various computing devices the cluster size that each respective autonomous vehicle should join together (i.e., smallest being K=1, ranging through various small, medium, and large sizes, Largest being K=20). Vehicle optimization program 122 operates to receive the cluster size from server application 134 and further communicates with similar situated autonomous vehicles and joins together to create a cluster. Ensuring that the clusters of autonomous vehicles travel through the intersection safely, without creating a collision with another autonomous vehicle. The variables X, Y, and Z are calculated in accordance with FIG. 10.

In operation 406, server application 134 of SAN 130 operates to monitor the IoT node (i.e., the intersection) to identify non-autonomous vehicles traveling through the intersection. Further, server application 134 of SAN 130 operates to analyze when a non-autonomous vehicle is traveling on the roadways and when the non-autonomous vehicle is expected to travel through the intersection. Further, server application 134 of SAN 130 operates to communicate this information to vehicle optimization program 122 and a plurality of computing devices identifying the non-autonomous vehicles. In an alternative embodiment of the present invention, SAN 130 operates to monitor the IoT node to identify non-autonomous vehicles traveling through the intersection. Additionally, in an alternative embodiment, SAN 130 operates to analyze when a non-autonomous vehicle is traveling on the roadways and when the non-autonomous vehicle is expected to travel through the intersection. In some alternative embodiments, SAN 130 communicates this information to vehicle optimization program 122 and a plurality of computing devices identifying the non-autonomous vehicles. Based upon the trajectory of the non-autonomous vehicles, SAN 130 instructs vehicle optimization 122 and various other computing devices to either reduce or increase the acceleration and trajectory of the non-autonomous vehicles to maintain that the clusters of autonomous vehicles and the non-autonomous vehicles travel through the intersection seamlessly without interruption and to avoid a collision between the vehicles. In various embodiments, server application 134 operates to generate a traffic control map that assigns a time frame based, at least in part, on the (i) trajectory and (ii) driving patterns of the clusters of autonomous vehicles for the clusters of autonomous vehicles to travel through the intersection node. Server application 134 communicates the traffic control map, via network 110, to computing device 120 and various other computing devices (not shown) instructing the clusters of autonomous vehicles of the (i) trajectory and (ii) driving patterns the clusters should maintain to safely travel through the intersection node and avoid collisions with any other vehicles traveling through the intersection node. In operation 406, vehicle optimization program 122 and server application 134 operate in tandem by communicating data and determining the size of the cluster based, at least in part, on the (i) user preferences, (ii) the trajectory and driving patterns of the primary autonomous vehicle, and (iii) the user preferences, trajectory and driving patterns of various other autonomous vehicles. In various embodiments, server application 134 determines a defined limit to the number of autonomous vehicles grouped in a cluster based, at least in part, on current traffic conditions.

In operation 408, responsive to identifying a non-autonomous vehicle traveling towards the intersection, server application 134 communicates to vehicle optimization program 122 and various other computing devices to collectively reduce their acceleration and trajectory in order to allow the non-autonomous vehicles to travel through the intersection before the cluster of autonomous vehicles enter the intersection to avoid a collision between the autonomous vehicles and non-autonomous vehicles. In an alternative embodiment, vehicle optimization program 122 and various computing devices communicate with server application 134 to request instructions, regarding non-autonomous vehicles traveling toward the intersection, to collectively reduce their acceleration and trajectory in order to allow the non-autonomous vehicles to travel through the intersection to avoid a collision between the autonomous vehicles and non-autonomous vehicles. In another alternative embodiment, vehicle optimization program 122 communicates with SAN 130 and various computing devices (i.e., autonomous vehicles) to identify the trajectory and position relative to the intersection (i.e., IoT node). Server application 134 operates to identify the trajectory of all clusters of autonomous vehicles approaching the intersection. Server application 134 instructs the individual clusters of autonomous vehicles to adjust the respective trajectory of the cluster to avoid colliding with other clusters of autonomous vehicles and/or non-autonomous vehicles within the intersection. Wherein, server application 134 operates to instruct each individual cluster of autonomous vehicles to seamlessly navigate through the intersection without colliding, and without the need of reducing the trajectory of the cluster to a complete stop before proceeding through the intersection. In one embodiment, vehicle optimization program 122 determines the location and trajectory of various clusters of autonomous vehicles and coordinates with SAN 130 and the various other clusters of autonomous vehicles to generate a system to allow each individual cluster of autonomous vehicles to pass through the intersection in segments to avoid collisions between the autonomous vehicles. In another embodiment, vehicle optimization program 122 operates to communicate with various other computing devices (not shown) in a first cluster of autonomous vehicles to maintain the trajectory of the cluster approaching an intersection (i.e., IoT node). Further, vehicle optimization program 122 communicates this data to various other clusters of autonomous vehicles (not shown) and SAN 130.

In various embodiments in operation 408, server application 134 operates to determine the threshold value to the number of autonomous vehicles in a cluster by optimizing the variable, K. Server application 134 calculates the time frame in which the traffic light remains "green" at an intersection. Server application determines the time frame by adjusting the variable K based, at least in part, on the variables Y and Z. Server application 134 operates to determine the distance of each respective cluster of autonomous vehicles to travel through the intersection. Server application 134 calculates the distance of each respective cluster of autonomous vehicles by adjusting the variable K based, at least in part, the variable X and the determination of the time frame for the traffic light to remain green. The variables X, Y, and Z are calculated in accordance with FIG. 10.

Figure 5:
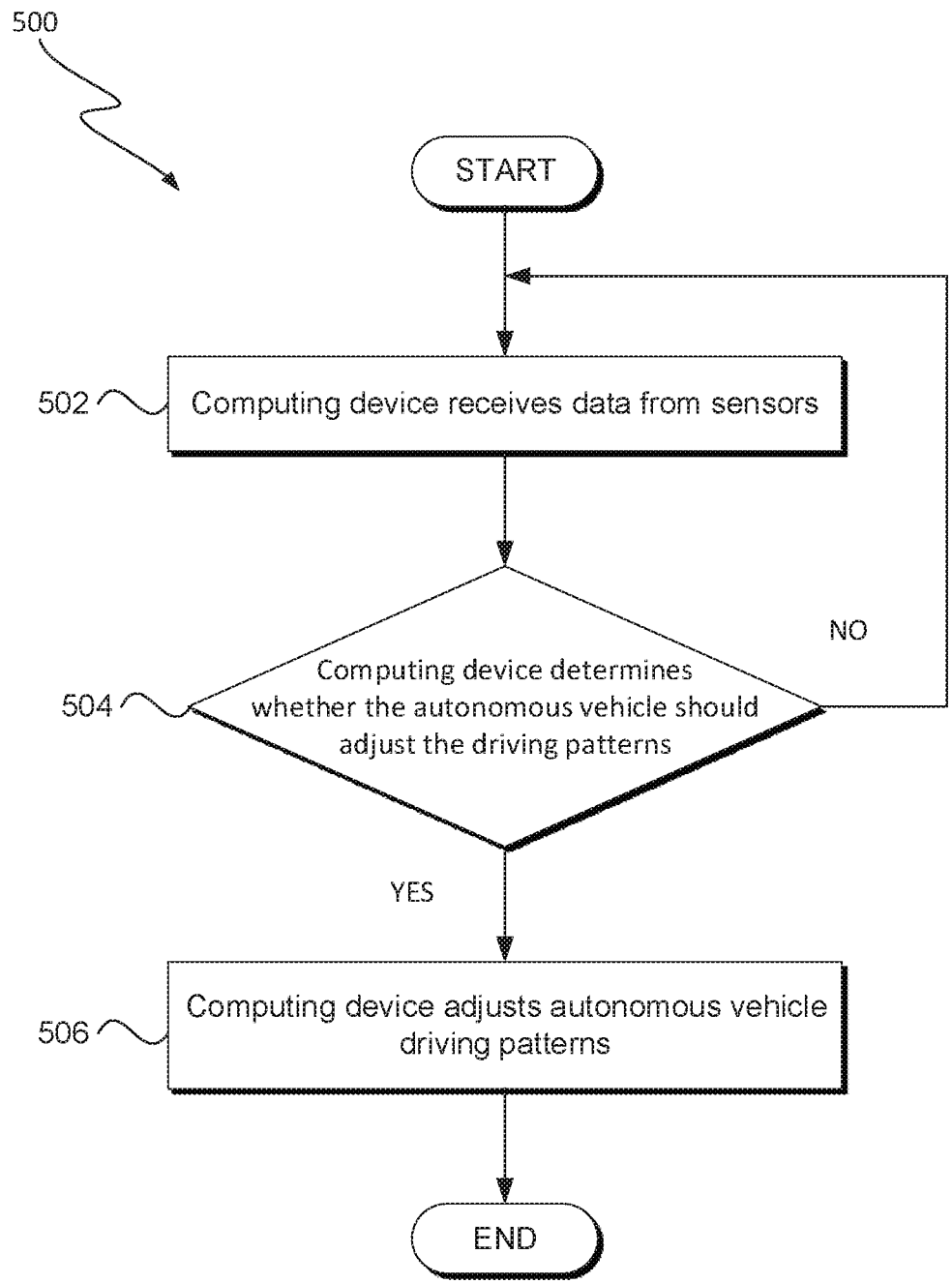
FIG. 5 illustrates operational processers for a computing device managing the driving patterns of an autonomous vehicles for computing environment 100, in accordance with an illustrative embodiment of the present invention.

FIG. 5 depicts a flowchart depicting operations for a computing device managing the driving patterns of an autonomous vehicles for computing environment 100, in accordance with an illustrative embodiment of the present invention. More specifically, FIG. 5 depicts combined overall operations 500 of vehicle optimization program 122 and sensors 124 executing on computing device 120. In some embodiments, operations 500 represents logical operations of vehicle optimization program 122, wherein vehicle optimization program 122 represents interactions between logical units executing on computing device 120. It should be appreciated that FIG. 5 provides an illustration of one implementation and does not imply any limitations with regard to the environments in which different embodiments may be implemented. Many embodiments to the depicted environments may be made. In one embodiment, the series of operations, of flowchart 500, can be performed simultaneously. Additionally, the series of operations, in flowchart 500, can be terminated at any operation. In addition to the features previously mentioned, any operations, of flowchart 500, can be resumed at any time.

In operation 502, vehicle optimization program 122, operating on computing device 120, (i) receives expression sentiment data from sensors 124, (ii) uses biometric data and matching algorithms to determine a likely emotional state of the passenger, and (iii) determine a likelihood that the passenger will interfere with the driving operation of the autonomous vehicle. As recognized above, sensors 124 operate to monitor the passengers occupying the autonomous vehicle and collected expression sentiment data. Further, sensors 124 operate to monitor the autonomous vehicle and its surrounding area. One having ordinary skill in the art would understand that sensors 124 operate to monitor the distance to an intersection, distance to objects and various other autonomous vehicles on the roadway, tire health, weather patterns, etc. Further, vehicle optimization program 122 leverages the profile information for each user when determining the likelihood that the passenger will interfere with the driving operation of the autonomous vehicle. Such profile information may include, but is not limited to, both the selected driving preferences that are stored in the profile but also historical behavioral patterns for the given passenger. For example, for a given set of circumstances, a passenger has historically interfered with the driving operation of the autonomous vehicle. As such, if vehicle optimization program 122 determines that a threshold number of those circumstances currently exists, then vehicle optimization program 122 determines there is an increased likelihood that the passenger will interfere with the driving operation of the autonomous vehicle and that the autonomous vehicle should adjust the trajectory and/or driving patterns of the vehicle.

If vehicle optimization program 122 determines that the autonomous vehicle should adjust the driving patterns of the vehicle (decision 505 YES branch), vehicle optimization program 122 instructs computing device 120 to adjust one or a combination of driving aspects, including, but are not limited to, (i) the trajectory of the vehicle, (ii) driving patterns of the vehicle and (iii) proximity of the vehicle to various other autonomous and/or non-autonomous vehicles based, at least in part, on (i) the data provided by sensors 124 or (ii) the data received from SAN 130 regarding data obtained by sensors from various other computing devices. For example, if vehicle optimization program 122 receives data from sensors 124 indicating that the passengers occupying the vehicle are exhibiting biometric data that matches those of a passenger that is frightened, then vehicle optimization program 122 instructs computing device 120 to reduce the velocity of the autonomous vehicle and provide a greater breadth between the primary autonomous vehicle and the surrounding autonomous vehicles. In general, vehicle optimization program 122 adjusts the driving aspects that govern the driving of the autonomous vehicle, i.e., adjusts the driving patterns, such that there is a reduced probability that the passengers will manually interfere with the autonomous drivers control of the car (operation 506). If vehicle optimization program 122 determines that the autonomous vehicle should not adjust the driving patterns of the vehicle (decision 504, NO branch), then vehicle optimization program 122 instructs computing device to maintain the current driving patterns of the autonomous vehicle. Vehicle optimization program 122 operates to continue to analyze the data received from sensors 124 and/or SAN 130 and determine whether computing device 120 should adjust the trajectory and/or driving patterns of the autonomous vehicle.

Figure 6:
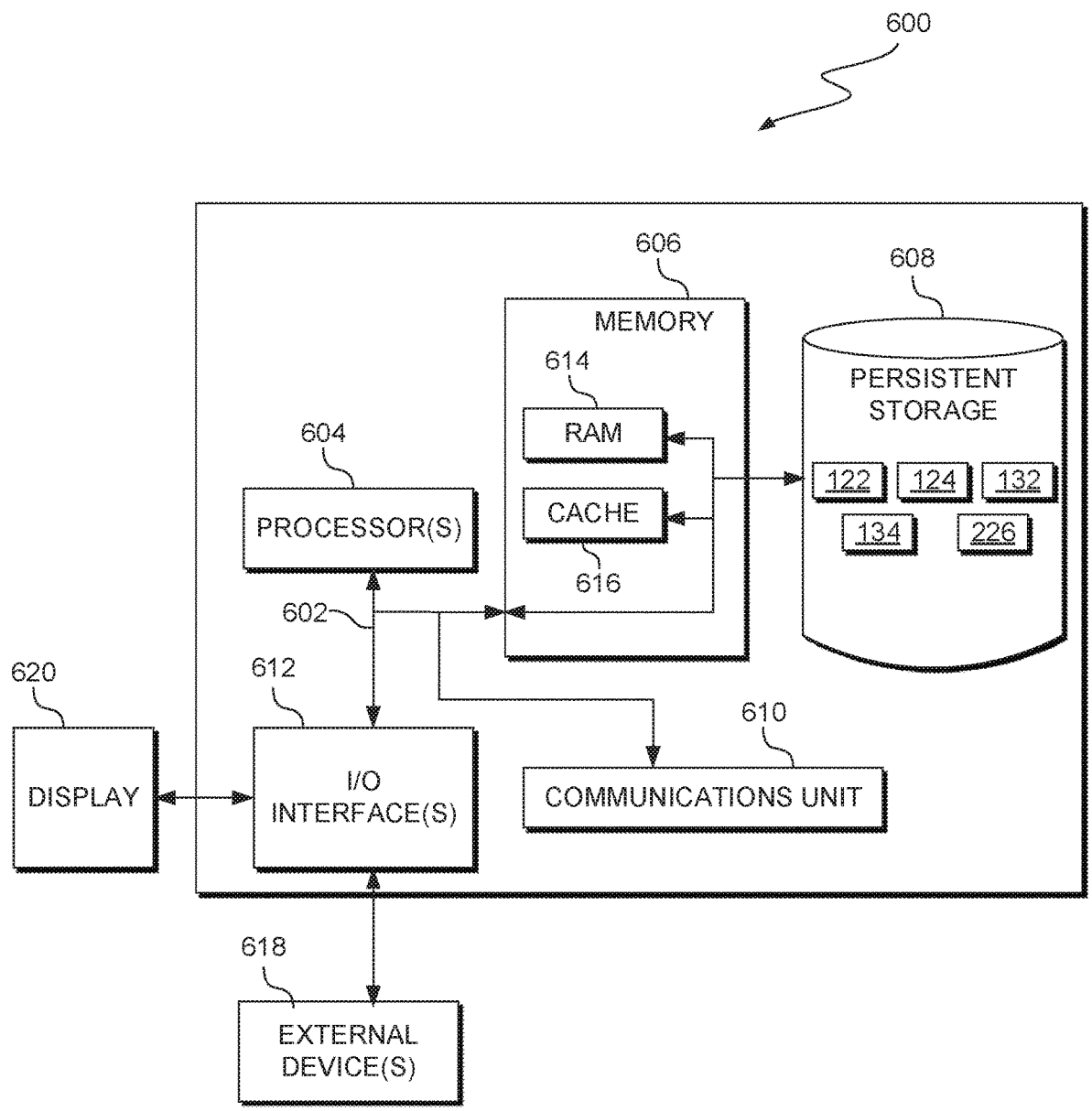
FIG. 6 depicts a block diagram of components of one or more computing devices within the computing environment depicted in FIG. 1, in accordance with an exemplary embodiment of the present invention.

FIG. 6 depicts a block diagram, 600, of components of computing device 120, SAN 130, and computing device 220, in accordance with an illustrative embodiment of the present invention. It should be appreciated that FIG. 6 provides only an illustration of one implementation and does not imply any limitations with regard to the environments in which different embodiments may be made.

Computing device 120, SAN 130, and computing device 220 includes communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer-readable storage media. In this embodiment, memory 606 includes random access memory (RAM) 614 and cache memory 616. In general, memory 606 can include any suitable volatile or non-volatile computer-readable storage media.

Vehicle optimization program 122, sensors 124, server system 132, server application, and devices 226 are stored in persistent storage 608 for execution and/or access by one or more of the respective computer processors 604 via one or more memories of memory 606. In this embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer-readable storage medium that is also part of persistent storage 608.

Communications unit 610, in these examples, provides for communications with other data processing systems or devices, including resources of network 110. In these examples, communications unit 610 includes one or more network interface cards. Communications unit 610 may provide communications through the use of either or both physical and wireless communications links. Vehicle optimization program 122, sensors 124, server system 132, server application, and devices 226 may be downloaded to persistent storage 608 through communications unit 610.

I/O interface(s) 612 allows for input and output of data with other devices that may be connected to computing device 120, SAN 130, and computing device 220. For example, I/O interface 612 may provide a connection to external devices 618 such as a keyboard, keypad, a touch screen, and/or some other suitable input device. External devices 618 can also include portable computer-readable storage media such as, for example, thumb drives, portable optical or magnetic disks, and memory cards. Software and data used to practice embodiments of the present invention, e.g., Vehicle optimization program 122, sensors 124, server system 132, server application, and devices 226, can be stored on such portable computer-readable storage media and can be loaded onto persistent storage 408 via I/O interface(s) 612. I/O interface(s) 612 also connect to a display 620.

Display 620 provides a mechanism to display data to a user and may be, for example, a computer monitor, or a television screen.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) such as, for example, "Smalltalk" and the like may be subject to trademark rights in various jurisdictions throughout the world and are used here only in reference to the products or services properly denominated by the marks to the extent that such trademark rights may exist.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
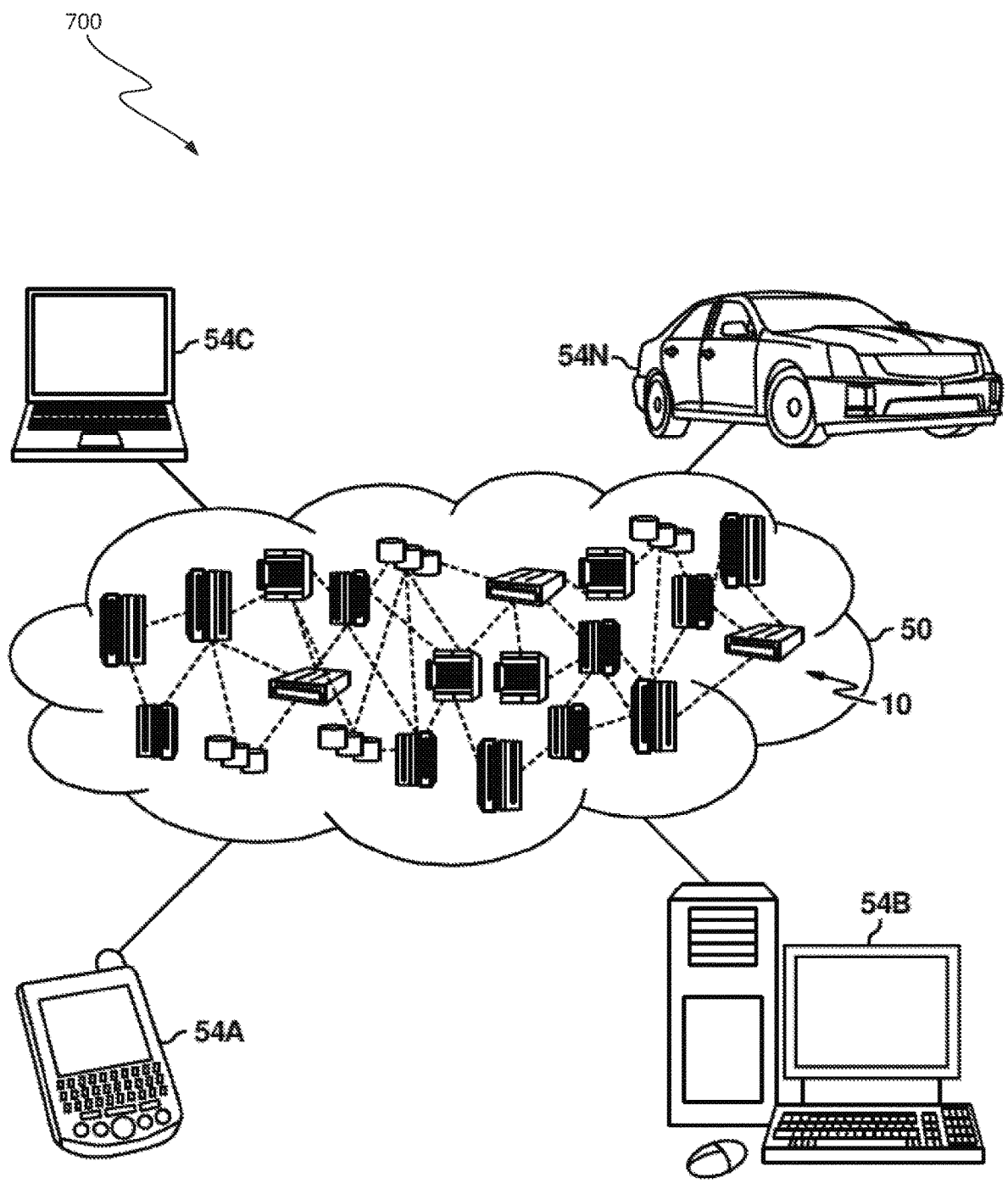
FIG. 7 depicts a cloud computing environment according to at least one embodiment of the present invention.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 8:
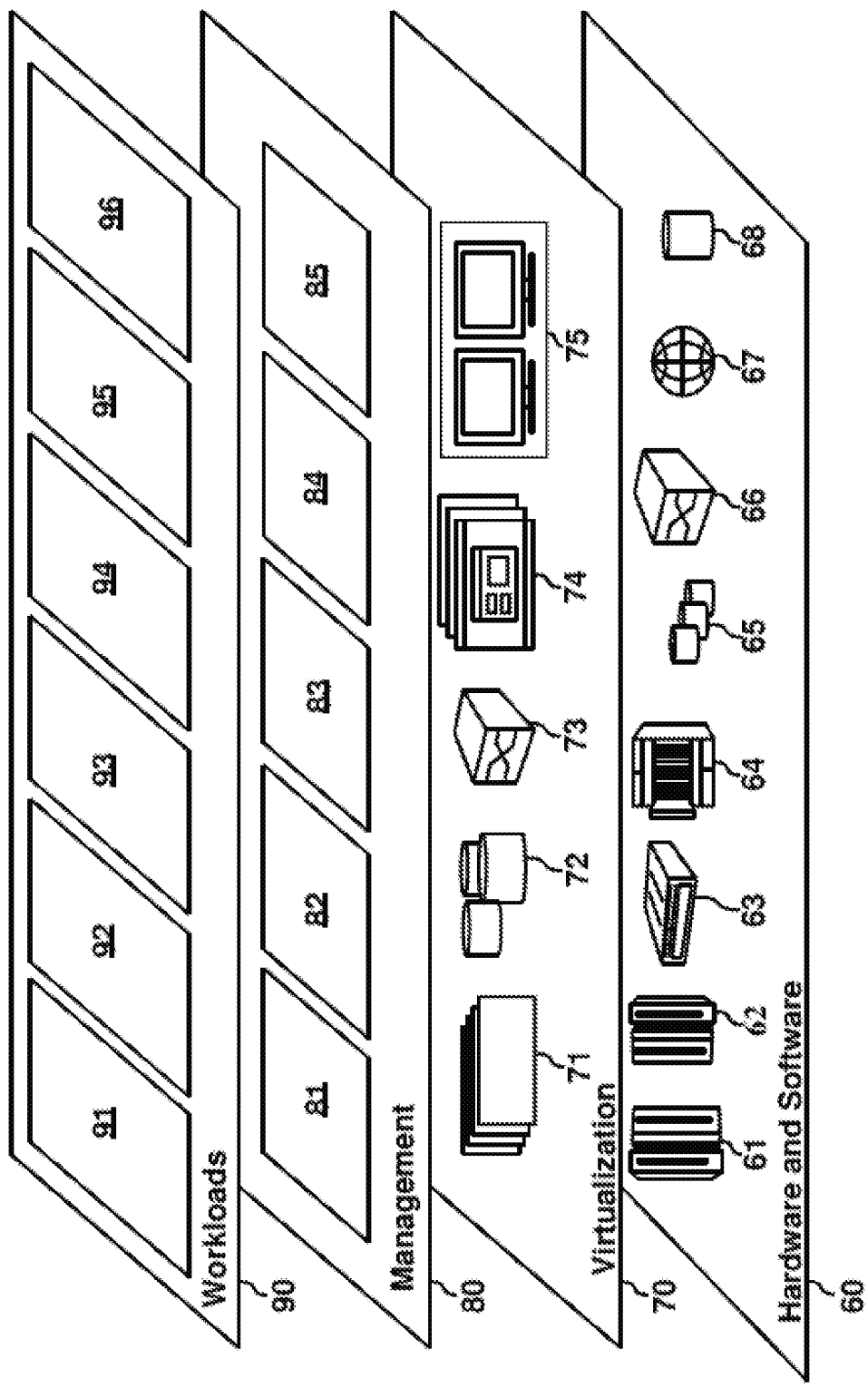
FIG. 8 depicts abstraction model layers according to at least on embodiment of the present invention.

Referring now to FIG. 8 a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and providing soothing output 96.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) such as, for example, "Smalltalk" and the like may be subject to trademark rights in various jurisdictions throughout the world and are used here only in reference to the products or services properly denominated by the marks to the extent that such trademark rights may exist.

Figure 9:
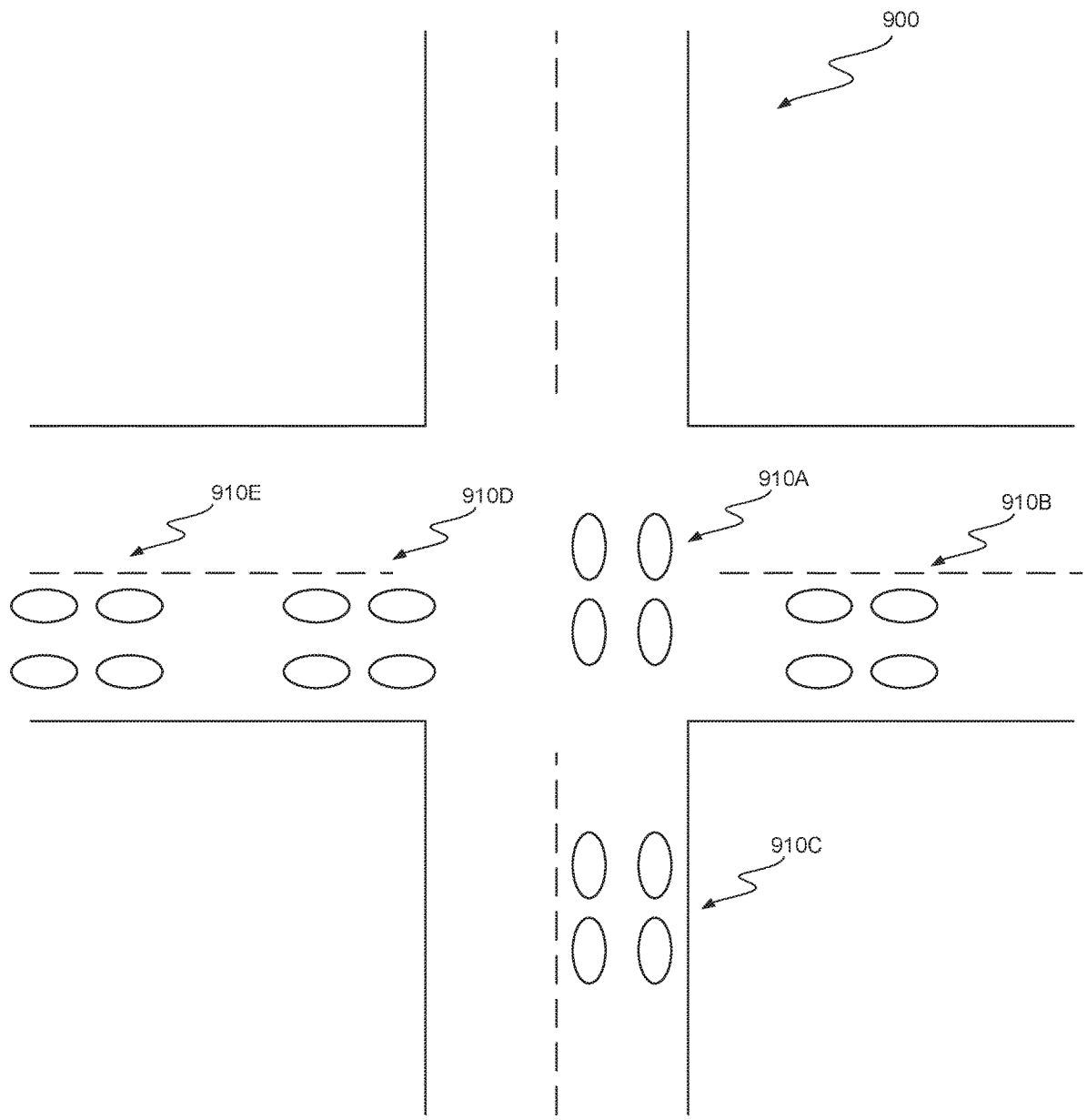
FIG. 9 depicts an environment of a plurality of autonomous vehicles controlled by the autonomous computing system within the computing environment depicted in FIG. 1, in accordance with an exemplary embodiment of the present invention.

FIG. 9 is a functional block diagram illustrating an IoT node for computing environment 100, generally designated 900, in accordance with one embodiment of the present invention. IoT node 900 includes computing device 120, SAN 130, and network 110. The present invention recognizes that FIG. 9 may include (not shown) any number of clusters computing devices, servers, databases and/or storage devices, and the present invention is not limited to what is depicted in FIG. 9.

In various embodiments of the present invention, cluster 910A-E represent clusters of autonomous vehicles. In some embodiments, clusters 910A-E include non-autonomous vehicles. One having ordinary skill in the art would recognize, as described above, that each autonomous vehicle contains a computing device (i.e., computing device 120) that operates as recognized above. In various embodiments, cluster 910B proceeded through the intersection node before cluster 910A entered through intersection node. Further, one having ordinary skill in the art would understand that, at least, a second cluster that approaches the intersection node and proceeds to travel through the intersection node after, at least, a first cluster approached the intersection node before the, at least, second cluster.

In various embodiments, as recognized above, sensors 124 operate on computing device 120 (i.e., an autonomous vehicle), and various other computing devices, to monitor and collect data regarding (i) the proximity of the primary autonomous vehicle to other autonomous vehicles and/or objects on the roadway and (ii) expression sentiment data from passengers occupying the respective autonomous vehicle. Sensors 124 communicate this data to vehicle optimization program 122. Vehicle optimization program 122 analyzes the data received from sensors 124 and determines whether vehicle optimization program 122 should instruct computing device 120 to adjust (i) the trajectory, (ii) the driving patterns, and (iii) the proximity to other autonomous vehicles within the cluster, in accordance with operations 300, 400, and 500, as recognized above. Further, FIG. 9 depicts clusters 910A-E, wherein the autonomous vehicles are spaced equidistantly apart from one another, as recognized above.

In various embodiments, as recognized above, clusters 910A-E operate to communicate with SAN 130 and each respective cluster through a network, such as network 110, to ensure that each respective cluster enters and travels through the intersection node during a defined time frame. Further, clusters 910A-E operate to communicate to ensure that, at least, two clusters are not traveling through simultaneously and do not collide with each other.

In some embodiments as depicted in FIG. 9, vehicle optimization program 122 operates to create as distance between various other autonomous vehicles of a cluster located on a roadway. As recognized above, computing devices operating on various autonomous vehicles in clusters 910A-E operate to monitor, collect and communicate various data including, but not limited to, expression sentiment data, proximity data, trajectory and driving pattern data. Sensors 124 communicate this data to vehicle optimization program 122. Vehicle optimization program 122 analyzes the data and operates to determine whether the primary autonomous vehicle is driving too close to the vehicle in front and/or behind the primary autonomous vehicle. Additionally, vehicle optimization program 122 operates to determine whether the primary autonomous vehicle is traveling to close to a vehicle to the left and/or right of the primary autonomous vehicle. If, vehicle optimization program 122 determines that any of the factors recognized above occur, vehicle optimization program 122 instructs computing device 120 to correct the trajectory and/or driving patterns of the primary autonomous vehicle to create distance between the various other autonomous vehicles to avoid a collision.

In various embodiments of the present invention, as depicted in FIG. 9, vehicle optimization program 122 operates to calculate variables, but are not limited to, i.e., X, Y, and Z, wherein the X variables represent, but are not limited to, the passenger profile (i.e., panic level, rider health, fear of accidents, thrill seeking, current state in which the passenger is in a hurry). The Y variables represent, but are not limited to, the traffic conditions (i.e., primary autonomous vehicle velocity, traffic density, number of autonomous vehicles in a cluster, distance to intersection, the current weather patterns, vehicle type, tire health, angle of the roadway, curvature of the roadway, and the number of lanes). The Z variables represent, but are not limited to, the cross traffic traveling through the intersection (i.e., velocity of the cross-traffic, cross-traffic density, number of autonomous vehicles in a cross-traffic cluster, distance of the cross-traffic cluster to the intersection, the weather conditions, angle of the cross-traffic roadway, curvature of the cross-traffic roadway, and the number of lanes in the cross traffic). X, Y, and Z are plotted in a plurality of dimensions, wherein K represents the clustering method used to group autonomous vehicles into separate classifications. Vehicle optimization program 122 operates to calculate the clustering of autonomous vehicles in real time as data is communicated between computing device 120 (i.e., primary autonomous vehicle), SAN 130 and various other computing devices (i.e., various other autonomous vehicles). Additionally, server application 134 operates to analyze the data received from computing device 120 and various other computing devices (not shown) as the autonomous vehicles approach the intersection. Server application 134 operates to cluster similarly situated vehicles and passengers into clusters to accommodate the (i) user preferences and (ii) trajectory and driving patterns of the autonomous vehicles. Server application 134 communicates to the various computing devices the cluster size that each respective autonomous vehicle should join together (i.e., smallest being K=1, ranging through various small, medium, and large sizes, Largest being K=20). Vehicle optimization program 122 operates to receive the cluster size from server application 134 and further communicates with similar situated autonomous vehicles and joins together to create a cluster. Ensuring that the clusters of autonomous vehicles travel through the intersection safely, without creating a collision with another autonomous vehicle. The variables X, Y, and Z are calculated in accordance with FIG. 10. In accordance with FIG. 10, (i) equation 1000A represents, at least, variable X, (ii) equation 1000B represents, at least 1000B and (iii) equation 1000C represents, at least, variable Z. In general, the variable K is calculated, at least, in accordance by (i) equation 1000A, (ii) equation 1000B and (iii) equation 1000C in FIG. 10.

In some embodiments, as depicted in FIG. 9, vehicle optimization program 122 and server application 134 operate in tandem by communicating data and determining the size of the cluster based, at least in part, on the (i) user preferences, (ii) the trajectory and driving patterns of the primary autonomous vehicle, and (iii) the user preferences, trajectory and driving patterns of various other autonomous vehicles. In various embodiments, server application 134 determines a defined limit to the number of autonomous vehicles grouped in a cluster based, at least in part, on current traffic conditions. Server application 134 operates to determine the limit to the number of autonomous vehicles in a cluster by optimizing the variable, K. Server application 134 calculates the time frame in which the traffic light remains "green" at an intersection. Server application determines the time frame by adjusting the variable K based, at least in part, on the variables Y and Z. Server application 134 operates to determine the distance of each respective cluster of autonomous vehicles to travel through the intersection. Server application 134 calculates the distance of each respective cluster of autonomous vehicles by adjusting the variable K based, at least in part, the variable X and the determination of the time frame for the traffic light to remain green. Lastly, server application 134 operates to determine the position of, at least, the primary autonomous vehicle in a cluster. Vehicle optimization program 122 receives data from sensors 124 and communicates this data to server application 134. Server application 134 operates to determine (i) the user preferences, and (ii) the trajectory and driving patterns of each respective autonomous vehicle. For example, server application 134 operates to determine that the passengers of, at least, the primary autonomous vehicle are anxious, and server application 134 operates to place the, at least, primary autonomous vehicle out of the front position of the cluster to maintain the passengers confidence in the autonomous vehicle and prevent a collision from occurring, wherein the passenger overrides the autonomy of the vehicle and takes control of the steering wheel. The variables X, Y, and Z are calculated in accordance with FIG. 10.

In accordance with FIG. 10, (i) equation 1000A represents, at least, variable X, (ii) equation 1000B represents, at least 1000B and (iii) equation 1000C represents, at least, variable Z. In general, the variable K is calculated, at least, in accordance by (i) equation 1000A, (ii) equation 1000B and (iii) equation 1000C in FIG. 10.

Regarding equation 1000A, a rider profile, denoted as variable X, is determined. In equation 1000A, five variables ($\beta1$-$\beta5$) are leveraged to determine a value corresponding to the rider profile. In equation 1000A, $\beta1_{panic\ level}$ is a value that represents a panic level associated with a given passenger. In equation 1000A, $\beta2_{rider\ health}$ is a value that represents a determined health status associated with the given passenger. In equation 1000A, $\beta3_{accident\ fear}$ is a value that represents a determined level of fear that is associated with the given passenger. In equation 1000A, $\beta4_{thrill\ seeking}$ is a value that represents a determined level of thrill seeking behavior associated with the given passenger. In equation 1000A, $\beta5_{hurry}$ is a value that represents a determined level of urgency associated with the user traveling to a destination.

Regarding equation 1000B, traffic conditions, denoted as variable Y, is determined. In equation 1000B, ten variables ($\beta1$-$\beta10$) are leveraged to determine a value corresponding to the traffic conditions. In equation 1000B, $\beta1_{car\ speed}$ is a value that represents the determined autonomous vehicle speed, measured by the autonomous vehicle's speedometer. In equation 1000B, $\beta2_{traffic\ density}$ is a value that represents the determined density (i.e., amount of vehicles) on the roadway. In equation 1000B, $\beta3_{cluster\ size}$ is a value that represents a determined size of autonomous vehicles cluster for efficient intersection management. In equation 1000B, $\beta4_{distance\ to\ intersection}$ is a value that represents a determined distance from the point of the autonomous vehicles to the point of the intersection. In equation 1000B, $\beta5_{weather}$ is a value that represents a determined weather patterns for the associated geographical location of the autonomous vehicle. In equation 1000B, $\beta6_{car\ type}$ is a value that represents a determined shape and classification of the autonomous vehicle (i.e., sedan, SUV, truck, etc.). In equation 1000B, $\beta7_{tire\ health}$ is a value that represents a determined level of tread in millimeters remaining on the tire. In equation 1000B, $\beta8_{road\ angle}$ is a value that represents a determined value in degrees of incline or decline of the roadway. In equation 1000B, $\beta9_{road\ curve}$ is a value that represents a determined value in degrees of curvature in the roadway. In equation 1000B, $\beta10_{number\ of\ lanes}$ is a value that represents a determined number of vehicle lanes on a roadway.

Regarding equation 1000C, traffic conditions, denoted as variable Z, is determined. In equation 1000C, ten variables ($\beta1$-$\beta8$) are leveraged to determine a value corresponding to the traffic conditions. In equation 1000C, $\beta1_{cross\ car\ speed}$ is a value that represents the determined autonomous vehicle speed, measured by the autonomous vehicle's speedometer. In equation 1000C, $\beta2_{cross\ traffic\ density}$ is a value that represents the determined density (i.e., amount of vehicles) of the cross-traffic on the roadway. In equation 1000C, $\beta3_{cross\ cluster\ size}$ is a value that represents a determined size of autonomous vehicles cluster in the cross traffic for efficient intersection management. In equation 1000C, $\beta4_{cross\ distance\ to\ intersection}$ is a value that represents a determined distance from the point of the autonomous vehicles in the cross traffic to the point of the intersection. In equation 1000C, $\beta5_{weather}$ is a value that represents a determined weather patterns for the associated geographical location of the autonomous vehicle. In equation 1000C, $\beta6_{road\ angle}$ is a value that represents a determined value in degrees of incline or decline of the roadway. In equation 1000C, $\beta7_{road\ curve}$ is a value that represents a determined value in degrees of curvature in the roadway. In equation 1000C, $\beta8_{number\ of\ lanes}$ is a value that represents a determined number of vehicle lanes on a roadway.

What is claimed is:

1. A computer-implemented method, the method comprising:
   monitoring, by one or more processors, via a plurality of sensors within an autonomous vehicle network, a computing device that identifies expression sentiment data;
   determining, by one or more processors, a clustering of a subset of a plurality of autonomous vehicles based, at least in part, on expression sentiment data of each passenger of a respective autonomous vehicle;
   monitoring, by one or more processors, via a node within the autonomous vehicle network, the plurality of autonomous vehicles traveling through an intersection;
   identifying, by one or more processors, a time frame in which each respective autonomous vehicle of the plurality of autonomous vehicles is predicted to pass through the intersection; and
   adjusting, by one or more processors, an aggregate traffic flow to allow each respective autonomous vehicles of the plurality of autonomous vehicles to pass through the intersection at a rate that maintains a threshold level of comfort for each passenger based, at least in part, on the determined clustering of the subset of the plurality of autonomous vehicles,
   wherein adjusting the aggregate traffic flow includes sending, to each respective autonomous vehicle of the plurality of autonomous vehicles, a respective set of program instructions to adjust a respective traffic flow of the respective autonomous vehicle based, at least in part, on a traffic control map.

2. The computer-implemented method of claim 1, wherein adjusting the aggregate traffic flow further includes:
   determining, by one or more processors, updated (i) trajectory and (ii) driving patterns for an autonomous vehicle based, at least in part, on the clustering of the subset of the plurality of autonomous vehicles.

3. The computer-implemented method of claim 1, the method further comprising:
   identifying, by one or more processors, respective sets of user preferences for each passenger associated with each respective autonomous vehicle of the plurality of autonomous vehicles, wherein determining the clustering of the subset of the plurality of autonomous vehicles is further based, at least in part, on the respective sets of user preferences.

4. The computer-implemented method of claim 1,
   wherein determining the clustering of the subset of the plurality of autonomous vehicles includes determining at least a first cluster of autonomous vehicles and a second cluster of autonomous vehicles; and wherein the respective set of program instructions to adjust the respective aggregate traffic flow of each respective autonomous vehicle includes program instructions instructing the respective autonomous vehicle to reposition within a proximity of one or more other autonomous vehicles in the respective cluster of the respective autonomous vehicle.

5. The computer-implemented method of claim 4, the method further comprising:
monitoring, by one or more processors, the repositioning of the respective autonomous vehicles to within the proximity of the one or more other autonomous vehicles in the respective cluster of the respective autonomous vehicle; and
further adjusting, by one or more processors, the aggregate traffic flow based, at least in part, on the monitoring of the repositioning of the respective autonomous vehicles.

6. The computer-implemented method of claim 5, the method further comprising:
determining, by one or more processors, a time frame for each respective cluster of autonomous vehicles to pass through the intersection.

7. The computer-implemented method of claim 4, wherein determining the clustering of the subset of the plurality of autonomous vehicles further includes limiting a respective number of autonomous vehicles in each cluster to less than a threshold number of autonomous vehicles.

8. A computer program product, the computer program product comprising one or more computer readable storage media and program instructions collectively stored on the computer readable storage media, the stored program instructions executable by a computer processor, the stored program instructions comprising:
program instructions to monitor via a plurality of sensors within an autonomous vehicle network, a computing device that identifies expression sentiment data;
program instructions to determine a clustering of a subset of a plurality of autonomous vehicles based on expression sentiment data of each passenger of a respective autonomous vehicle;
program instructions to monitor via a node within the autonomous vehicle network, the plurality of autonomous vehicles traveling through an intersection;
program instructions to identify a time frame in which each respective autonomous vehicle of the plurality of autonomous vehicles is predicted to pass through the intersection;
program instructions to adjust an aggregate traffic flow to allow each respective autonomous vehicle of the plurality of autonomous vehicles to pass through the intersection at a rate that maintains a threshold level of comfort for each passenger based, at least in part, on the determined clustering of the subset of the plurality of autonomous vehicles,
wherein adjusting the aggregate traffic flow includes sending, to each respective autonomous vehicle of the plurality of autonomous vehicles, a respective set of program instructions to adjust a respective traffic flow of the respective autonomous vehicle based, at least in part, on a traffic control map.

9. The computer program product of claim 8, the stored program instructions further comprising:
program instructions to determine updated (i) trajectory and (ii) driving patterns for an autonomous vehicle based, at least in part, on the clustering of the subset of the plurality of autonomous vehicles.

10. The computer program product of claim 8, the stored program instructions further comprising:
program instructions to identify respective sets of user preferences for each passenger associated with each respective autonomous vehicle of the plurality of autonomous vehicles, wherein determining the clustering of the subset of the plurality of autonomous vehicles is further based, at least in part, on the respective sets of user preferences.

11. The computer program product of claim 8,
wherein determining the clustering of the subset of the plurality of autonomous vehicles includes determining at least a first cluster of autonomous vehicles and a second cluster of autonomous vehicles; and
wherein the respective set of program instructions to adjust the respective aggregate traffic flow of each respective autonomous vehicle includes program instructions instructing the respective autonomous vehicle to reposition within a proximity of one or more other autonomous vehicles in the respective cluster of the respective autonomous vehicle.

12. The computer program product of claim 11, the stored program instructions further comprising:
program instructions to monitor the repositioning of the respective autonomous vehicles to within the proximity of the one or more other autonomous vehicles in the respective cluster of the respective autonomous vehicle; and
program instructions to further adjust the aggregate traffic flow based, at least in part, on the monitoring of the repositioning of the respective autonomous vehicles.

13. The computer program product of claim 12, the stored program instructions further comprising:
program instructions to determine a time frame for each respective cluster of autonomous vehicles to pass through the intersection.

14. The computer program product of claim 11, wherein determining the clustering of the subset of the plurality of autonomous vehicles further includes limiting a respective number of autonomous vehicles in each cluster to less than a threshold number of autonomous vehicles.

15. A computer system, the computer system comprising:
one or more computer processors;
one or more computer readable storage medium; and
program instructions stored on the computer readable storage medium for execution by at least one of the one or more processors, the stored program instructions comprising:
program instructions to monitor via a plurality of sensors within an autonomous vehicle network, a computing device that identifies expression sentiment data;
program instructions to determine a clustering of a subset of a plurality of autonomous vehicles based on expression sentiment data of each passenger of a respective autonomous vehicle;
program instructions to monitor via a node within the autonomous vehicle network, the plurality of autonomous vehicles traveling through an intersection;
program instructions to identify a time frame in which each respective autonomous vehicle of the plurality of autonomous vehicles is predicted to pass through the intersection; and
program instructions to adjust an aggregate traffic flow to allow each respective autonomous vehicles of the plurality of autonomous vehicles to pass through the intersection at a rate that maintains a threshold level of comfort for each passenger based, at least in part, on the determined clustering of the subset of the plurality of autonomous vehicles, wherein adjusting the aggregate traffic flow includes sending, to each respective autonomous vehicle of the plurality of autonomous vehicles, a respective set of program instructions to adjust a respective traffic flow of the respective autonomous vehicle based, at least in part, on a traffic control map.

16. The computer system of claim 15, the stored program instructions further comprising:

program instructions to determine updated (i) trajectory and (ii) driving patterns for an autonomous vehicle based, at least in part, on the clustering of the subset of the plurality of autonomous vehicles.

17. The computer system of claim 15, wherein determining the clustering of the subset of the plurality of autonomous vehicles includes determining at least a first cluster of autonomous vehicles and a second cluster of autonomous vehicles; and wherein the respective set of program instructions to adjust the respective aggregate traffic flow of each respective autonomous vehicle includes program instructions instructing the respective autonomous vehicle to reposition within a proximity of one or more other autonomous vehicles in the respective cluster of the respective autonomous vehicle.

18. The computer system of claim 17, the stored program instructions further comprising:

program instructions to monitor the repositioning of the respective autonomous vehicles to within the proximity of the one or more other autonomous vehicles in the respective cluster of the respective autonomous vehicle; and program instructions to further adjust the aggregate traffic flow based, at least in part, on the monitoring of the repositioning of the respective autonomous vehicles.

19. The computer system of claim 18, the stored program instructions further comprising:

program instructions to determine a time frame for each respective cluster of autonomous vehicles to pass through the intersection.

20. The computer system of claim 17, wherein determining the clustering of the subset of the plurality of autonomous vehicles further includes limiting a respective number of autonomous vehicles in each cluster to less than a threshold number of autonomous vehicles.

\* \* \* \* \*